United States Patent
Chiang et al.

(10) Patent No.: US 7,050,953 B2
(45) Date of Patent: May 23, 2006

(54) DYNAMICAL METHODS FOR SOLVING LARGE-SCALE DISCRETE AND CONTINUOUS OPTIMIZATION PROBLEMS

(75) Inventors: Hsiao-Dong Chiang, Ithaca, NY (US); Hua Li, Ithaca, NY (US)

(73) Assignee: Bigwood Technology Incorporated, Ithaca, NY (US)

(*) Notice: Subject to any disclaimer, the term of this patent is extended or adjusted under 35 U.S.C. 154(b) by 892 days.

(21) Appl. No.: 10/153,070

(22) Filed: May 22, 2002

(65) Prior Publication Data

US 2003/0220772 A1    Nov. 27, 2003

(51) Int. Cl.
*G06F 17/10* (2006.01)

(52) U.S. Cl. .............. 703/2; 700/28; 706/19

(58) Field of Classification Search ............ 703/2; 706/19; 705/2, 7; 707/2; 716/2; 700/28
See application file for complete search history.

(56) References Cited

U.S. PATENT DOCUMENTS

| | | | | |
|---|---|---|---|---|
| 5,471,408 A | * | 11/1995 | Takamoto et al. | 703/2 |
| 6,076,030 A | * | 6/2000 | Rowe | 701/50 |
| 6,490,572 B1 | * | 12/2002 | Akkiraju et al. | 706/19 |
| 6,606,529 B1 | * | 8/2003 | Crowder et al. | 700/100 |
| 6,826,549 B1 | * | 11/2004 | Marks et al. | 706/11 |
| 2002/0111780 A1 | | 8/2002 | Sy | 703/2 |
| 2002/0183987 A1 | | 12/2002 | Chiang | 703/2 |

OTHER PUBLICATIONS

H.D. Chiang and L. Fekih-Ahmed, "Quasistablity Regions of Nonlinear Dynamical Systems: Theory", IEEE Trans. on Circuits and Systems: I Fundamental Theory and Applications, vol. CAS-43, Aug. 1996, pp. 627-635.

Hsiao-Dong Chiang and Chia-Chi Chu, "A Systematic Search Method for Obtaining Multiple Local Optimal Solutions of Nonlinear Programming Problems", IEEE Trans. on Circuits and Systems: I Fundamental Theory and Applications, vol. 43, No. 2, Feb. 1996, pp. 99-109.

H.D. Chiang, M Hirsch and F.F. Wu, "Stability Regions of Nonlinear Autonomous Dynamical Systems", IEEE Trans. On Automatic Control vol. AC-33, Jan. 1988, pp. 16-27.

* cited by examiner

*Primary Examiner*—Albert W. Paladini
(74) *Attorney, Agent, or Firm*—Brown & Michaels, PC

(57) ABSTRACT

Dynamical methods for obtaining the global optimal solution of general optimization problems having closed form or black box objective functions, including the steps of first finding, in a deterministic manner, one local optimal solution starting from an initial point, and then finding another local optimal solution starting from the previously found one until all the local optimal solutions starting from any initial point are found, and then finding from said points the global optimal solution.

58 Claims, 5 Drawing Sheets

DYNAMICAL METHODS FOR SOLVING LARGE-SCALE DISCRETE AND CONTINUOUS OPTIMIZATION PROBLEMS

BACKGROUND OF THE INVENTION

1. Field of the Invention

The invention pertains to the field of mathematical analysis and modeling, nonlinear programming and optimization technology. More particularly, the invention pertains to dynamical methods for systematically obtaining local optimal solutions, as well as, the global optimal solution of continuous as well as discrete optimization problems.

2. Description of Related Art

A large variety of the quantitative issues such as decision, design, operation, planning, and scheduling abound in practical systems in the sciences, engineering, and economics that can be perceived and modeled as either continuous or discrete optimization problems. Typically, the overall performance (or measure) of a system can be described by a multivariate function, called the objective function. According to this generic description, one seeks the best solution of an optimization problem, often expressed by a real vector, in the solution space which satisfies all stated feasibility constraints and minimizes (or maximizes) the value of an objective function. The vector, if it exists, is termed the globally optimal solution. For most practical applications, the underlying objective functions are often nonlinear and depend on a large number of variables; making the task of searching the solution space to find the globally optimal solution very challenging. The primary challenge is that, in addition to the high-dimension solution space, there are many local optimal solutions in the solution space; the globally optimal solution is just one of them and yet both the globally optimal solution and local optimal solutions share the same local properties.

In general, the solution space of an optimization problem has a finite (usually very large) or infinite number of feasible solutions. Among them, there is one and, only one, global optimal solution, while there are multiple local optimal solutions (a local optimal solution is optimal in a local region of the solution space, but not in the global solution space.) Typically, the number of local optimal solutions is unknown and it can be quite large. Furthermore, the values of an objective function at local optimal solutions and at the global optimal solution may differ significantly. Hence, there are strong motivations to develop effective methods for finding the global optimal solution.

We next discuss the discrete optimization problem. The task of solving discrete optimization problems is very challenging. They are generally NP-hard (No solution algorithm of polynomial complexity is known to solve them). In addition, many discrete optimization problems belong to the class of NP-complete problems for which no efficient algorithm is known. A precise definition of NP-complete problems is available in the literature. Roughly speaking, NP-complete problems are computationally difficult; any numerical algorithm would require in the worst case an exponential amount of time to correctly find the global optimal solution.

One popular approach to attack discrete optimization problems is to use the class of iterative improvement local search algorithms [1]. They can be characterized as follows: start from an initial feasible solution and search for a better solution in its neighborhood. If an improved solution exists, repeat the search process starting from the new solution as the initial solution; otherwise, the local search process will terminate. Local search algorithms usually get trapped at local optimal solutions and are unable to escape from them. In fact, the great majority of existing optimization techniques for solving discrete optimization problems usually come up with local optimal solutions but not the global optimal one.

The drawback of iterative improvement local search algorithms has motivated the development of a number of more sophisticated local search algorithms designed to find better solutions by introducing some mechanisms that allow the search process to escape from local optimal solutions. The underlying 'escape' mechanisms use certain search strategies to accept a cost-deteriorating neighborhood to make escape from a local optimal solution possible. These sophisticated local search algorithms include simulated annealing, genetic algorithm, Tabu search and neural networks.

However, it has been found in many studies that these sophisticated local search algorithms, among other problems, require intensive computational efforts and usually can not find the globally optimal solution.

In addition, several effective methods are developed in this invention for addressing the following two important and challenging issues in the course of searching for the globally optimal solution:

(i) how to effectively move (escape) from a local optimal solution and move on toward another local optimal solution; and (ii) how to avoid revisiting local optimal solutions which are already known.

In the past, significant efforts have been directed towards attempting to address these two issues, but without much success. Issue (i) is difficult to solve and the existing methods all encounter this difficulty. Issue (ii), related to computational efficiency during the course of search, is also difficult to solve and, again, the majority of the existing methods encounter this difficulty. Issue (ii) is a common problem which degrades the performance of many existing methods searching for the globally optimal solution: re-visitation of the same local optimal solution several times; this action indeed wastes computing resources without gaining new information regarding the location of the globally optimal solution. From the computational viewpoint, it is important to avoid revisiting the same local optimally solution in order to maintain a high level of efficiency.

SUMMARY OF THE INVENTION

The task of finding the global optimal solution of general optimization problems is important for a very broad range of various engineering disciplines and the sciences. The invention presents dynamical methods for obtaining the global optimal solution of general optimization problems including the steps of first finding, in a deterministic manner, one local optimal solution starting from an initial point, and then finding another local optimal solution starting from the previously found one until all the local optimal solutions are found, and then finding from said points the global optimal solution.

We propose that an effective approach to solve general optimization problems is the one that first finds multiple, if not all, local optimal solutions and then select the best solution from them.

In the present invention, we develop a new systematic methodology, which is deterministic in nature, to find all the local optimal solutions of general optimization problems.

The following dynamical methodologies for solving various types of optimization problems are developed in this invention:

a dynamical methodology for solving unconstrained continuous optimization problems whose objective function can be a closed-form expression or a black-box expression (i.e. its objective function is computable for every point in the solution space, but has no closed-form expression)

a dynamical methodology for solving unconstrained discrete optimization problems whose objective function can be a closed-form expression or a black-box expression.

a dynamical methodology for solving constrained discrete optimization problems whose objective function has a closed-form expression.

a dynamical methodology for solving constrained discrete optimization problems with black-box objective functions.

To address issue (i), we develop in this invention a DDP-based numerical method, which, in combination with the DDP search method, performs a systematical procedure that, starting from a local optimal solution, move away from the solution and find another local optimal solution in an effective and deterministic manner. To address issue (ii), we develop in this invention an anti-revisiting search method to avoid revisiting the local optimal solutions that are already known. The theoretical basis of the anti-revisiting search method rests on the dynamical decomposition points developed in this invention.

In the present invention, the effective methods developed to overcome these issues (i) & (ii) are then incorporated into two dynamical methodologies for finding all the local optimal solutions of general discrete optimization problems. One distinguishing feature of these two dynamical methodologies is that these dynamical methodologies can incorporate any existing local search algorithm to achieve computation efficiency in finding a local optimal solution, while maintaining the global ability to find all of the local optimal solutions.

The developed dynamical methods can easily incorporate any current optimization method. This is a big advantage for users of our invention because they do not have to abandon their customized optimization methods that are very efficient in finding a local optimal solution. Our methods will use the customized methods to efficiently find a local optimal solution and will direct the customized methods to move from one local optimal solution from another.

Dynamical methods developed in this invention can be programmed into computer packages, and can be combined with effective existing computer packages to find the complete set of local optimal solutions. The invention can be programmed to interface with any existing computer package without the need to modify the 'environment' of the existing computer package, including the graphical user interface and database. In particular, this invention imposes no new learning curve for the user in the resulting computer packages. This feature of intellectual property reuse of the existing computer package makes this invention very attractive.

DETAILED DESCRIPTION OF THE INVENTION

General Optimization Problems

Figure 1:
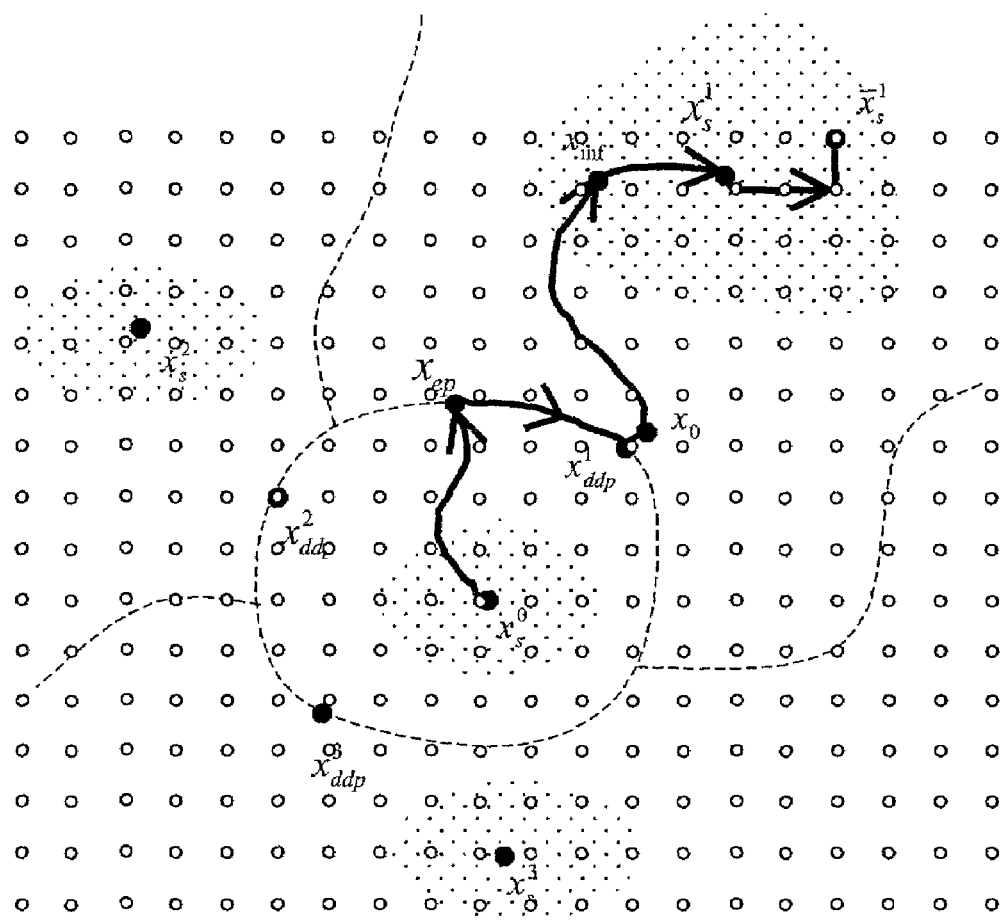
FIG. 1 shows a graph of a DDP-based method for finding a local optimal solution from a known local optimal solution in the continuous space
Figure 2:
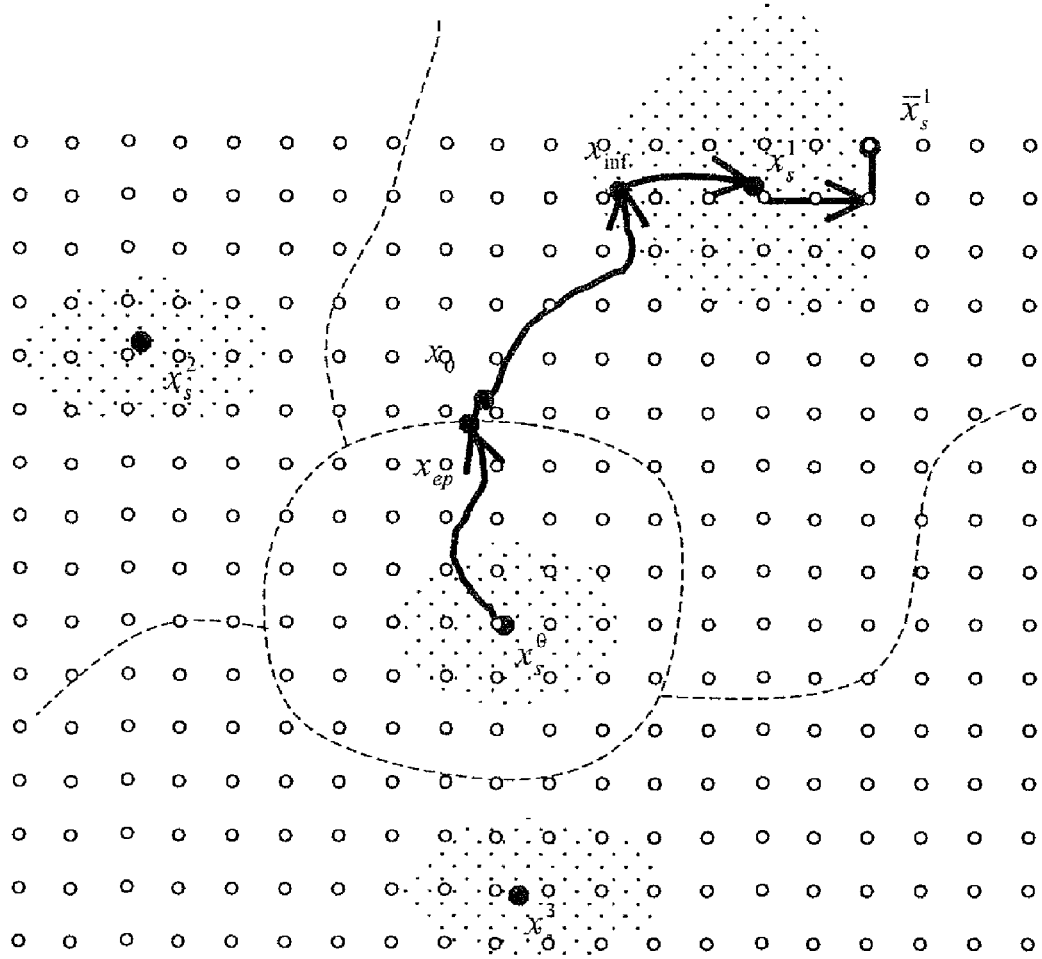
FIG. 2 shows a graph of an EP-based method for finding a local optimal solution from a known local optimal solution in the continuous space
Figure 3:
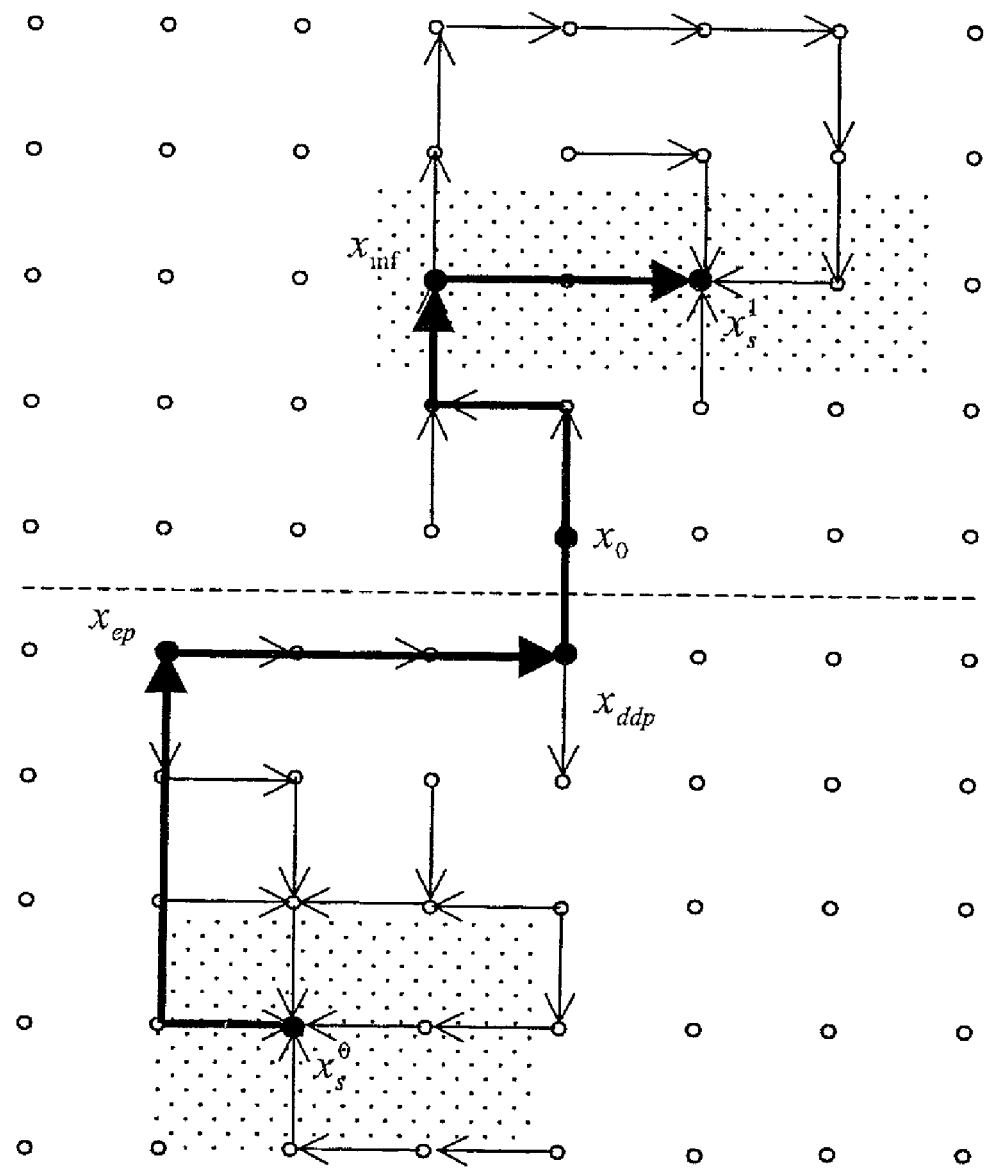
FIG. 3 shows a graph of a DDP-based method for finding a local optimal solution from a known local optimal solution in the discrete space
Figure 4:
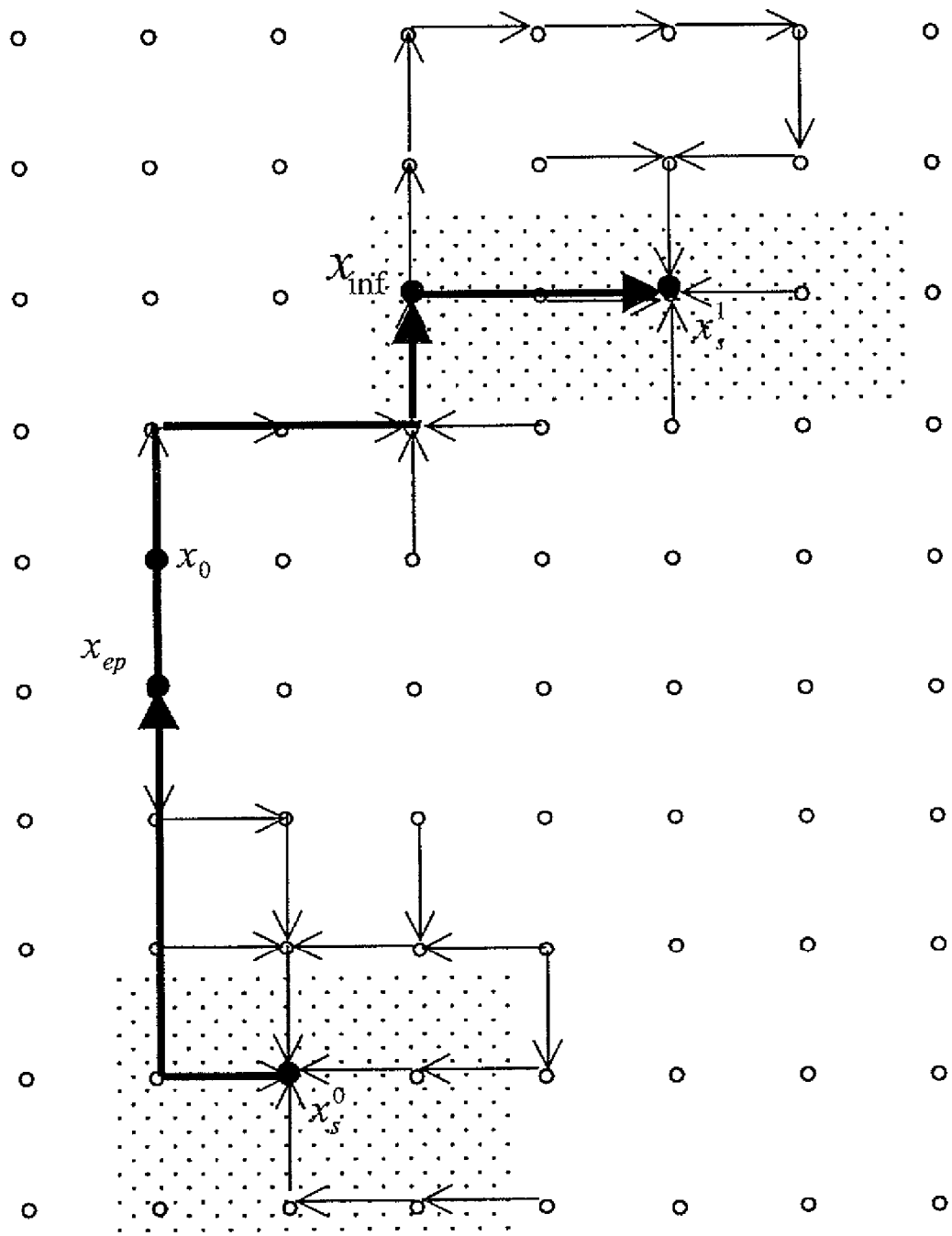
FIG. 4 shows a graph of an EP-based method for finding a local optimal solution from a known local optimal solution in the discrete space
Figure 5:
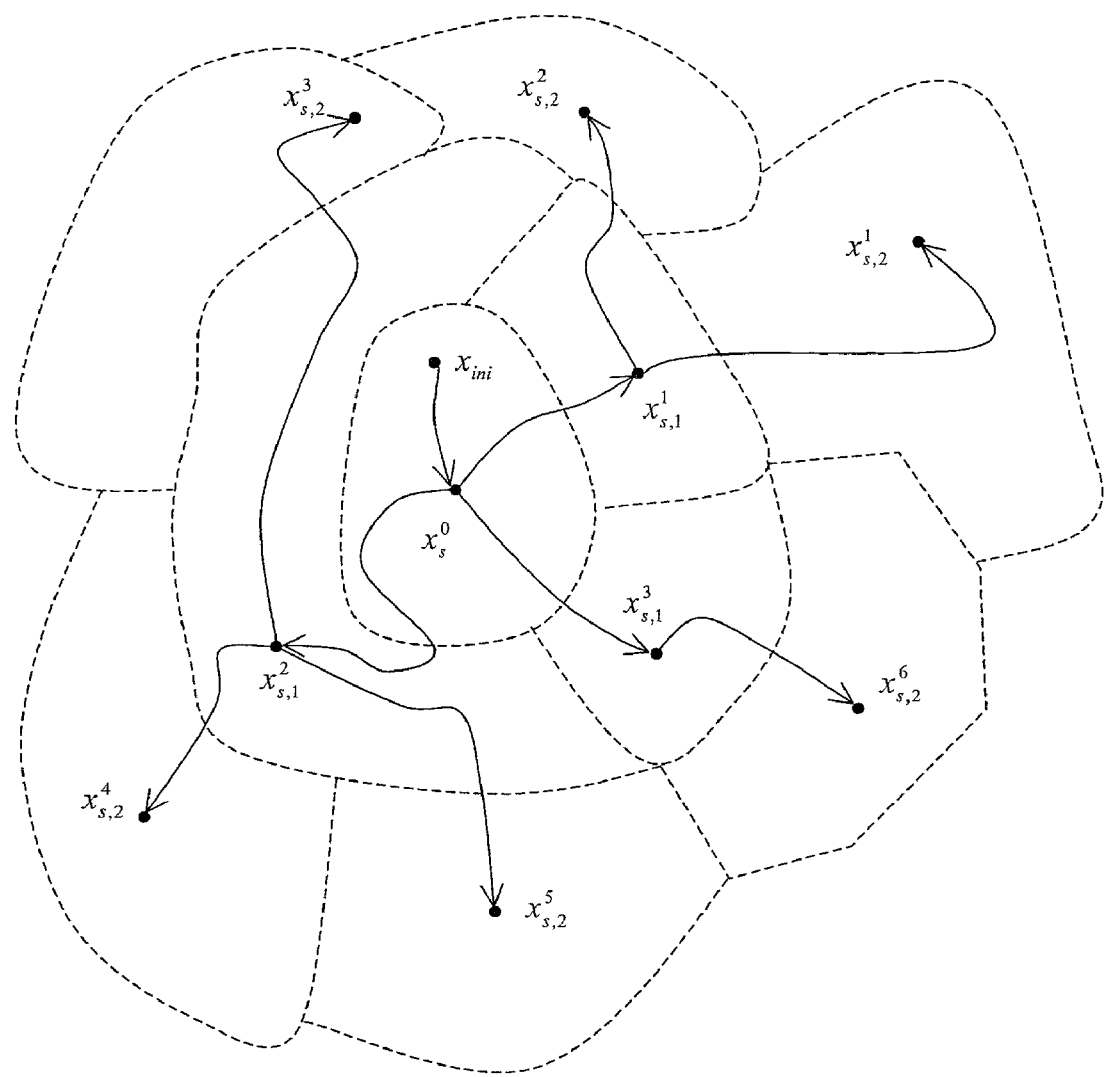
FIG. 5 shows an illustration of finding all local optimal solutions

We consider in this invention general nonlinear optimization problems which are conventionally divided into nonlinear continuous optimization problems and nonlinear discrete optimization problems. They can be further divided into the following four classes The class of unconstrained continuous optimization problems where the objective function can be either a closed-form expression or a black-box expression.

The class of constrained continuous optimization problems where the objective function can be either a closed-form expression or a black-box expression.

The class unconstrained discrete optimization problems where the objective function can be either a closed-form expression or a black-box expression.

The class constrained discrete optimization problems where the objective function can be either a closed-form expression or a black-box expression.

We developed a dynamical method to find all of their local optimal solutions for each class of nonlinear optimization problems and to find the global optimal solution.

We next describe each class of nonlinear optimization problems.

Unconstrained Continuous Optimization Problems

A general unconstrained continuous optimization problem is of the form:

$$\text{Minimize UC}(x) \qquad (4\text{-}1)$$

where the objective function UC: $R^n \to R$ can be either a closed-form expression or a black-box expression. The function UC(x) is bounded below so that its global minimal (optimal) solution exists and the number of local minimal (optimal) solutions is finite. An expression for a black-box objective function is not available; instead, it is only computable, which can be viewed as an external subroutine which takes a state vector x and returns the corresponding objective function value UC(x).

Constrained Continuous Optimization Problems

A general constrained continuous optimization problem is of the form:

$$\text{Minimize C}(x)$$

$$\text{Subject to } G(x) \leq 0 \qquad (4\text{-}2)$$

where the objective function C: $R^n \to R$ can be either a closed-form expression or a black-box expression. The collection of state vectors satisfying the inequality expressed by the constraint equations, G(x), is called the feasible region. The function C(x) is a bounded below over the feasible region so that its global minimal (optimal) solution exists and the number of local minimal (optimal) solutions is finite.

Unconstrained Discrete Optimization Problems

A general unconstrained discrete optimization problem is of the form:

$$\text{Minimize } UC(x) \tag{4-3}$$

where the objective function UC: S→R can be either a closed-form expression or a black-box expression. The function UC(x) is a bounded below so that its global minimal (optimal) solution exists and the number of local minimal (optimal) solutions is finite.

Constrained Discrete Optimization Problems

A general constrained discrete optimization problem is of the form:

$$\text{Minimize } C(x) \tag{4-4}$$
$$\text{Subject to } x \in FS$$

where the objective function C: S→R can be either a closed-form expression or a black-box expression. The function C(x) is a bounded below so that its global minimal (optimal) solution exists and the number of local minimal (optimal) solutions is finite. The constraint set, FS, is composed of all the feasible solutions. The set FS is characterized either by a set of constraint equations with analytical expressions or by a computable black box model which can be viewed as an external subroutine which takes a state vector x and returns the satisfiability of constraints. The state space S is a finite or countably infinite set.

Obviously, this class of discrete optimization problems includes the following problems.

$$\text{Minimize } C(x)$$
$$\text{Subject to } G(x) \leq 0 \tag{4-5}$$

where the objective function C: S→R can be either a closed-form expression or a black-box expression. The function C(x) is a bounded below function over the feasible region so that its global minimal solution exists and the number of local minimal solutions is finite. The constraint function vector G: S→$R^m$ has closed-form expression. The state space S is a finite or countably infinite set.

We developed in this invention dynamical methods for solving the optimization problems described by (4-1), (4-3) and (4-5), to be presented in the following sections.

5. Dynamical Methods for Solving Unconstrained Continuous Optimization Problems

We present in this section dynamical methods for solving unconstrained optimization problems (4-1).

To solve the unconstrained continuous optimization problem (4-1), we develop a dynamical methodology by utilizing certain trajectories of the following associated nonlinear dynamical system to guide the search of all local optimal solutions:

$$\dot{x} = f(x) \tag{5-1}$$

where $x \in R^n$ and the vector field f(x) satisfies the existence and uniqueness of solutions.

We propose the following sufficient conditions for such nonlinear dynamical systems whose certain trajectories can be employed to locate all the local optimal solutions of optimization problem (4-1).

(LC1) every trajectory of the nonlinear dynamical system (5-1) converges, and converges to one of its equilibrium points; and (LC2) every stable equilibrium point of the system (5-1) is a local optimal solution of the optimization problem (4-1) and vice versa.

(LC3) the objective function of the optimization problem (4-1) decreases along every trajectory of the nonlinear dynamical system (5-1)

Next we will show that, given any unconstrained continuous optimization problem (4-1) either with an analytical closed-form objective function or with an black-box objective function, we can construct a nonlinear dynamical system, satisfying (LC1)~(LC3), in the form of (5-1).

We first develop the following two theorems to provide some guidelines for finding the nonlinear dynamical system.

We say a function, say E(x), is an energy function of (5-1) if the following two conditions are satisfied: (1) the derivative of E(x) along any system trajectory of (5-1) is non-positive, i.e, $\dot{E}(x) \leq 0$; (ii) if x(t) is not an equilibrium point of (5-1), then the set $\{t \in R: \dot{E}(x) = 0\}$ along x(t) has a measure zero in R.

Theorem 5-1: If the dynamic system (5-1) has an energy function, then the condition (LC1) is satisfied.

Theorem 5-2: If the objective function of the unconstrained continuous optimization problem (4-1) is a energy function of the nonlinear dynamic system (5-1), then conditions (LC2) and (LC3) are satisfied.

It can be shown that for the optimization problem (4-1) with an analytical closed-form objective function, say UC, one example of a nonlinear dynamical system satisfying conditions (LC1)~(LC3) is the following:

$$\dot{x} = -\nabla UC(x) \tag{5-2}$$

where $\nabla(UC): R^n \to R^n$ is the gradient vector of the objective function UC. Generally speaking, there are nonlinear dynamical systems other than the one described by equation (5-2) that satisfy conditions (LC1) through (LC3) whose certain dynamical trajectories can be employed to compute all the local optimal solutions of problem (4-1) with analytical objective functions. We can put these nonlinear dynamical systems into the following general form:

$$\dot{x} = F_C^U(x) \tag{5-3}$$

For the optimization problem (4-1) with a black-box objective function, say UC, the task of constructing a nonlinear dynamical system satisfying conditions (LC1)~(LC3) is difficult. One can develop several methods to resolve this difficulty; one of them, described below, is based on the divided-difference of the black-box object function $$\dot{x}_i = \frac{UC(x + h \times e_i) - UC(x)}{h}, i = 1, 2, \ldots, n \tag{5-4}$$

where the derivative of UC with respect to the ith component of x is approximated by the above one-sided differences, $e_i$ is the ith Cartesian basis vector and h is a sufficiently small scalar. Another nonlinear dynamical system can be constructed based on the following central differences of the black-box objective function $$\dot{x}_i = \frac{UC(x + h \times e_i) - UC(x - h \times e_i)}{2h}, i = 1, 2, \ldots, n \quad (5\text{-}5)$$

where the derivative of UC(x) with respect to the i-th component of x is approximated by the above central differences, $e_i$ is the i-th Cartesian basis vector and h is a sufficiently small scalar.

There may exist other nonlinear dynamical systems, in addition to those described by (5-4) or (5-5) above, satisfying conditions (LC1)~(LC3) for solving the unconstrained continuous optimization problem (4-1) with black-box objective functions. We put these nonlinear dynamical systems into the following general form:

$$\dot{x} = F^U_{UC}(x) \quad (5\text{-}6)$$

For clarity of explanation, we put both the nonlinear dynamical system (5-3) associated with an analytical closed-from objective function and the nonlinear dynamical system (5-6) associated with a black-box objective function into the following general form.

$$\dot{x} = F^U(x) \quad (5\text{-}7)$$

Several basic definitions and facts about the nonlinear dynamical system (5-7) are presented as follows [2][4].

The solution of (5-7) starting from $x \in R^n$ at t=0 is called a trajectory, denoted by $\phi_t(x): R \to R^n$.

A state vector $x^* \in R^n$ if is called an equilibrium point of system (5-7) if $F^U(x)=0$. We say that an equilibrium point $x^* \in R^n$ of (5-7) is hyperbolic if the Jacobian matrix of F(·) at $x^*$ has no eigenvalues with a zero real part. If the Jacobian of the hyperbolic equilibrium point has exactly k eigenvalues with positive real part, we call it a type-k equilibrium point. It can be shown that for a hyperbolic equilibrium point, it is a (asymptotically) stable equilibrium point if all the eigenvalues of its corresponding Jacobian have a negative real part and an unstable equilibrium point if all the eigenvalues of its corresponding Jacobian have a positive real part. For a type-k hyperbolic equilibrium point $x^*$, its stable and unstable manifolds $W^s(x^*)$, $W^u(x^*)$ are defined as follows:

$$W^s(x^*) = \left\{ x \in R^n : \lim_{t \to \infty} \phi_t(x) = x^* \right\}$$

$$W^u(x^*) = \left\{ x \in R^n : \lim_{t \to -\infty} \phi_t(x) = x^* \right\}$$

where the dimension of $W^u(x^*)$ and $W^s(x^*)$ is k and n−k, respectively.

A set K in $R^n$ is called to be an invariant set of (5-7) if every trajectory of (5-7) starting in K remains in K for all $t \in R$. A dynamical system is called completely stable if every trajectory of the system converges to one of its equilibrium points.

The stability region (or region of attraction) of a stable equilibrium point $x_s$ is the collection of all the points whose trajectories all converge to be defined as:

$$A(x_s) := \left\{ x \in R : \lim_{t \to \infty} \phi_t(x) = x_s \right\}$$

The quasi-stability region $A_p(x_s)$ of a stable equilibrium point $x_s$ is defined as:

$$A_p(x_s) = int(\overline{A(x_s)})$$

where $\overline{A(x_s)}$ is the closure of the stability region $A(x_s)$, and $int(\overline{A(x_s)})$ is the interior of $\overline{A(x_s)}$. From a topological point of view, $A(x_s)$ and $A_p(x_s)$ are open, invariant, and path-connected sets; moreover, they are diffeomorphic to $R^n$.

The following theorem [3], together with the above two theorems, presents the theoretical foundation for the dynamical methods developed in this invention for solving the unconstrained continuous optimization problem (4-1) by utilizing its associated nonlinear dynamical system (5-7) satisfying conditions (LC1) through (LC3).

Theorem 5-3: Consider a nonlinear dynamical system described by (5-7) that satisfies condition (LC1). Let $\partial A_p(x_s)$ be the quasi-stability region of $x_s$ and $x_d \in \partial A_p(x_s)$ be a dynamical decomposition point. If the intersections between the stable and unstable manifolds of the equilibrium points on $\partial A_p(x_s)$ satisfy the transversality condition, then there exists another one and only one stable equilibrium point, say $\bar{x}_s$, of (5-1) such that:
(1). $x_d \in \partial A_p(\bar{x}_s)$ is a dynamical decomposition point with respect to $\bar{x}_s$; and
(2). $W^u(x_d) \cap A_p(x_s) \neq \phi$ and $W^u(x_d) \cap A_p(\bar{x}_s) \neq \phi$ where: a dynamical decomposition point refers to a type-one equilibrium point lying on the quasi-stability boundary of the nonlinear dynamical system (5-7); and $W^u(x_d)$ refers to the unstable manifold of the dynamical decomposition point $x_d$.

5.1 Hybrid Local Search Method

We develop a hybrid local search method, by combining a trajectory-based method and one effective local method, for reliably finding local optimal solutions. The hybrid local search method will be then incorporated into the dynamical methods developed in this invention.

A hybrid local search method for reliably obtaining a local optimal solution for the unconstrained continuous optimization problem (4-1) starting from an initial point is presented below:

Given: an initial point, say $x_0$.
Purpose: reliably compute a local optimal solution of the unconstrained continuous optimization problem (4-1).
Step 1. Apply an effective local search algorithm to the unconstrained continuous optimization problem (4-1), starting from the initial point, say $x_0$.
Step 2. If the local search algorithm converges to a local optimal solution, then stop; otherwise, proceed to the next step;
Step 3. Integrate the associated nonlinear dynamical system (5-7) starting from the initial point $x_0$ for a few time-steps to get an end point. Set the end point as the initial point and go to step 1.

5.2 Method for Computing Exit Point (EP)

Given a local optimal solution of the unconstrained continuous optimization problem (4-1) (i.e. a stable equilibrium point (s.e.p.) of the associated nonlinear dynamical system (5-7)), say $x_s$, and a pre-defined search path starting from the s.e.p., we develop a method for computing the exit point of the nonlinear dynamic system (5-7) associated with an optimization problem (4-1), termed herein the method for computing exit point, presented below:

Given: a local optimal solution, say $x_s$, a pre-defined search path and the associated nonlinear dynamical system (5-7).

Purpose: find the corresponding exit point (EP) with respect to the pre-defined search path and to the corresponding s.e.p, $x_s$ of the dynamical system (5-7).

Starting from a known local optimal solution, say $x_s$, move along a pre-defined search path to compute said exit point, which is the first local maximum of the objective function of the optimization problem (4-1) along the pre-defined search path.

Another method for computing exit point: move along the search path starting from $x_s$, and at each time-step, compute the inner-product of the derivative of the search path and the vector field of the nonlinear dynamic system (5-7). When the sign of the inner-product changes from positive to negative, say between the interval $[t_1, t_2]$, then either the point which is the search path at time $t_1$ or the point which is the search path at time $t_2$ can be used to approximate the exit point.

5.3. Method for Computing Dynamic Decomposition Point (DDP)

Given a local optimal solution of the unconstrained continuous optimization problem (4-1) (i.e. a stable equilibrium point (s.e.p.) of the associated nonlinear dynamical system (5-7)), say $x_s$, and a pre-defined search path starting from the s.e.p., we develop a method for computing the DDP of the associated nonlinear dynamical system (5-7) with respect to the local optimal solution $x_s$, which is also a s.e.p. of (5-7), and with respect to the pre-defined search path, termed herein the as method for computing dynamical decomposition point (DDP), as follows:

Given: a local optimal solution, say $x_s$, of the optimization problem (4-1), a pre-defined search path and the associated nonlinear dynamical system (5-7).

Purpose: find the corresponding dynamical decomposition point (DDP) with respect to the pre-defined search path and with respect to the local optimal solution.

Step 1. Starting from a known local optimal solution $x_s$, move along a pre-defined search path, say $\phi_t(x_s)$, to compute the exit point of the quasi-stability boundary of $x_s$ of the system (5-7). Let the exit point be denoted as $x_{ex}$.

Step 2. Starting from $x_{ex}$, compute the minimal distance point (MDP) by the following steps:

(i). Integrate the associated nonlinear dynamic system (5-7) for a few time-steps; letting the end point be denoted as the current exit point.

(ii). Draw a ray connecting the current exit point and the local optimal solution, say $x_s$, and replace said current exit point with a corrected exit point, which is the first local maximal point of objective function along said ray, starting from $x_s$, and assign this corrected exit point to said exit point, namely $x_{ex}$.

(iii). Repeat the step (i) and (ii) until the norm of the vector field (5-7) at said current exit point obtained in step (ii) is smaller than a threshold value, i.e, $\|F^U(x_{ex})\| \leq \epsilon$. Then said point is declared as a minimal distance point (MDP), say $x_d^0$.

Step 3. Using said MDP $x_d^0$ as an initial guess and solving the set of nonlinear algebraic equations of said vector field $F^U(x)=0$ of system (5-7), wherein a solution is the DDP, say $x_{ddp}$, with respect to the $x_s$ and with respect to said search path $\phi_t(x_s)$.

5.4. EP-based Method for Finding Another Local Optimal Solution

For the optimization problem (4-1), this invention develops an exit-point-based (EP-based) method for finding a local optimal solution starting from a known local optimal solution.

Given: a local optimal solution, say $x_s$, of the continuous optimization problem (4-1).

Purpose: find a new local optimal solution of the continuous optimization problem (4-1).

Step 1. Starting from the known local optimal solution $x_s$, apply the method for computing exit point (EP) to the nonlinear dynamic system (5-7) to compute an EP, denoted as $x_{ex}$.

Step 2. Set $x_0 = x_s + (1+\epsilon)(x_{ex} - x_s)$ where $\epsilon$ is a small number.

Step 3. Starting from $x_0$, conduct a transitional search by integrating nonlinear dynamic system (5-7) to obtain the corresponding system trajectory until it reaches an interface point. $x_{inf}$, at which an effective (hybrid) local search method outperforms the transitional search.

Step 4. Starting from the interface point $x_{inf}$, apply the (hybrid) local search method, chosen in step 3, to find an adjacent local optimal solution.

5.5. DDP-based Method for Finding Another Local Optimal Solution

For the optimization problem (4-1), this invention develops a DDP-based method for finding a local optimal solution starting from a known local optimal solution.

Given: a local optimal solution, say $x_s$, of the continuous optimization problem (4-1).

Purpose: find a new local optimal solution of the continuous optimization problem (4-1).

Step 1. Starting from a known local optimal solution $x_s$, apply the method for computing dynamic decomposition point to system (5-7) to find a DDP, denoted as $x_{ddp}$.

Step 2. Set $x_0 = x_s + (1+\epsilon)(x_{ddp} - x_s)$ where $\epsilon$ is a small number.

Step 3. Starting from $x_0$, conduct a transitional search by integrating dynamic system (5-7) to obtain the corresponding system trajectory until it reaches an interface point. $x_{inf}$, at which an effective (hybrid) local search method outperforms the transitional search.

Step 4. Starting from the interface point $x_{inf}$, apply the effective (hybrid) local search method, chosen in step 3, to find the corresponding local optimal solution.

5.6. Dynamical Methods for Finding all Tier-one Local Optimal Solutions

Before presenting the methods, we first present the definitions for the tier-one local optimal solutions (i.e. stable equilibrium points) and tier-N local optimal solutions (i.e. stable equilibrium points) with respect to a known local optimal solution in the continuous solution space of the optimization problem (4-1) (i.e. the state space of the associated nonlinear dynamical system (5-7)) as follows.

Tier-one local optimal solutions: A local optimal solution $x_{s1}$ of the optimization problem (4-1) is said to be a tier-one local optimal solution to a known local optimal solution $x_{s0}$, if the closure of the stability region of $x_{s1}$ of the associated nonlinear dynamical system (5-7) and that of $x_{s0}$ intersect each other.

Tier-N local optimal solution: A local optimal solution $x_{sn}$ of the optimization problem (4-1) is said to be a tier-N (N>1) local optimal solution to a known local optimal solution $x_{s0}$, if $x_{sn}$ meets the follows two conditions:
(i) $x_{sn}$ is neither a tier-(N−2) nor tier-(N−1) local optimal solution of $x_{s0}$.
(ii) $x_{sn}$ is a tier-1 local optimal solution of one of the tier-(N−1) local optimal solutions of $x_{s0}$.

It is obvious that the tier-zero local optimal solution of $x_{s0}$ is $x_{s0}$ itself.

Tier-one and Tier-N local optimal solutions of the optimization problem (4-2), (4-3) and (4-4) are defined similarly.

For the optimization problem (4-1), this invention develops two groups of methods for finding all tier-one local optimal Solutions. The first group is EP-based while the second group is DDP-based.

EP-based Method
Given: a local optimal solution, say $x_s^0$ of the continuous optimization problem (4-1).
Purpose: find all tier-one local optimal solutions of $x_s^0$ of the continuous optimization problem (4-1).
Step 1. Initialize the set of tier-one local optimal solutions $V_s=\{\phi\}$ and define a set of search paths $S_i$ for $x_s^0$, i=1,2, ..., m. Set i=1.
Step 2. For each search path $S_i$ starting from $x_s^0$, compute the corresponding local optimal solution.
(i). Apply the EP-based method to system (5-7) to find another local optimal solution. If a local optimal solution is found, then let it be denoted as $x_s^i$ and proceed to the next step; otherwise go to step (iii).
(ii) Check if $x_s^i$ has been found before, i.e, $x_s^i \in V_s$. If not found, set $V_s=V_s \cup \{x_s^i\}$.
(iii). Set i=i+1.
(iv) repeat steps (i) through (iii) until i>m.
Step 3. Output the set of tier-one local optimal solutions, $V_s$, of $x_s^0$.

DDP-based Method
Given: a local optimal solution, say $x_s^0$ of the continuous optimization problem (4-1).
Purpose: find all tier-one local optimal solutions of $x_s^0$ of the continuous optimization problem (4-1).
Step 1. Initialize the set of dynamical decomposition points $V_{ddp}=\{\phi\}$ and set of tier-one local optimal solutions $V_s=\{\phi\}$.
Step 2. Define a set of search paths $S_i$ for $x_s^0$, i=1,2, ..., $m_j$. And set i=1.
Step 3. For each search path $S_i$ starting from $x_s^0$, compute its corresponding local optimal solution using the following steps
(i). Apply the method for computing dynamical decomposition point (DDP) to system (5-7) to find the corresponding DDP. If a DDP is found, proceed to next step; otherwise, go to step (vi).
(ii). Letting the found DDP be denoted as $x_{ddp,i}$, check if it belongs to the set $V_{ddp}$, i.e., $x_{ddp,i} \in V_{ddp}$. If it does, go to step (vi); otherwise set $V_{ddp}=V_{ddp} \cap \{x_{ddp,i}\}$ and proceed to next step.
(iii). Set $x_{0,i}=x_s^0+(1+\epsilon)(x_{ddp,i}-x_s^0)$, where $\epsilon$ is a small number.
(iv). Starting from $x_{0,i}$, conduct a transitional search by integrating dynamic system (5-7) to obtain the corresponding system trajectory until it reaches an interface point, say $x_{inf,i}$, at which an effective hybrid local search method outperforms the transitional search.
(v). Starting from the interface point $x_{inf,i}$, apply the effective hybrid local search method, chosen in step (iv), to find the corresponding local optimal solution with respect to $x_{ddp,i}$, denoted as $x_s^i$. And set $V_s=V_s \cap \{x_s^i\}$.
(vi). Set i=i+1.
(v) repeat steps (i) through (vi) until i>$m_j$.
Step 4. Output the set of tier-one local optimal solutions, $V_s$ of $x_s^0$.

5.7 Methods for Finding all Local Optimal Solutions
For the optimization problem (4-1), this invention develops two dynamical methods for finding all local optimal solutions. The first method is an EP-based method while the second method is a DDP-based method.

EP-based Method
Given: an initial point, say $x_0$ of the continuous optimization problem (4-1).
Purpose: (i) find all local optimal solutions of the continuous optimization problem (4-1).
(ii) find the global optimal solution of the continuous optimization problem (4-1).
Step 1. Starting from $x_0$, apply an effective (hybrid) search method to find a local optimal solution, say $x_s^0$.
Step 2. Set j=0. Initialize the set of local optimal solutions $V_s=\{x_s^0\}$, the set of tier-j local optimal solutions $$V_{new}^j = \{x_s^0\}.$$

Step 3. Initialize the set of tier-(j+1) local optimal solutions $$V_{new}^{j+1} = \{\phi\}.$$

Step 4. For each local optimal solution in $V_{new}^J$, say, $x_s^J$, find its all tier-one local optimal solutions.
(i). Define a set of search paths $S_i^J$ for $x_s^J$, i=1,2, ..., $m_j$ and set i=1.
(ii). For each search path $S_i^J$ starting from $x_s^J$, apply the EP-based method to find another local optimal solution. If a local optimal solution is found, then let it be denoted as $x_{s,j}^i$ and proceed to the next step; otherwise, go to step (iv).
(iii). Check if $x_{s,j}^i$ has been found before, i.e. $x_{s,j}^i \in V_s$? If it is a new local optimal solution, set $$V_s = V_s \cup \{x_{s,j}^i\} \text{ and } V_{new}^{j+1} = V_{new}^{j+1} \cup \{x_{s,j}^i\}.$$

(iv). Set i=i+1.
(v) repeat steps (ii) through (iv) until i>$m_j$.
Step 5. If the set of all newly computed local optimal solutions, $$V_{new}^{j+1},$$

is empty, continue with step (6); otherwise set j=j+1 and go to step (3).
Step 6. Output the set of local optimal solutions $V_s$ and identify the best optimal solution from the set of $V_s$ by comparing their corresponding objective function values in set $V_s$ and selecting the one with the smallest value. And output it as the global optimal solution.

DDP-based Method

Given: an initial point, say $x_0$.

Purpose: (i) find all local optimal solutions of the continuous optimization problem (4-1).

(ii) find the global optimal solution of the continuous optimization problem (4-1).

Step 1. Starting from $x_0$, apply an effective hybrid local search method to find a local optimal solution, say $x_s^0$.

Step 2. Set j=0. Initialize the set of local optimal solutions $V_s=\{x_s^0\}$, the set of tier-j local optimal solutions $V_{new}^j=\{x_s^0\}$, and the set of found dynamic decomposition points $V_{ddp}=\{\phi\}$.

Step 3. Initialize the set of tier-(j+1) local optimal solutions $$V_{new}^{j+1} = \{\phi\}.$$

Step 4. For each local optimal solution in $V_{new}^J$, say $x_s^J$, find its all tier-one local optimal solutions.

(i). Define a set of search paths $S_i^J$ for $x_s^J$, i=1,2,..., $m_j$ and set i=1.

(ii) For each search path $S_i^J$ starting from $x_s^J$, apply an effective method to nonlinear system (5-7) to find the corresponding dynamical decomposition point (DDP). If a DDP is found, proceed to the next step; otherwise, go to the step (viii).

(iii). Letting the found DDP be denoted as $x_{ddp,i}^j$, check if it belongs to the set $V_{ddp}$, i.e., $x_{ddp,i}^j \in V_{ddp}$.

If it does, go to step (viii); otherwise set $V_{ddp} = V_{ddp} \cup \{x_{ddp,i}^j\}$ and proceed to the next step.

(iv). Set $$x_{0,i}^j = x_s^j + (1 + \varepsilon)(x_{ddp,i}^j - x_s^j),$$

where $\varepsilon$ is a small number.

(v). Starting from $x_{0,i}^j$, conduct a transitional search by integrating the nonlinear dynamic system (5-7) to obtain the corresponding system trajectory until it reaches an interface point. $x_{inf,i}^j$, at which an effective hybrid local search method outperforms the transitional search.

(vi). Starting from the interface point $x_{inf,i}^j$, apply the effective hybrid local search method, chosen in step (v), to find the corresponding local optimal solution, denoted as $x_{s,j}^i$.

(vii). Check if $x_{s,j}^i$ has been found before, i.e. $x_{s,j}^i \in V_s$. If it is a new local optimal solution, set $V_s = V_s \cup \{x_{s,j}^i\}$, $V_{new}^{j+1} = V_{new}^{j+1} \cup \{x_{s,j}^i\}$.

(viii). Set i=i+1.

(ix) repeat steps (ii) through (viii) until $i > m_j^k$.

Step 5. If the set of all newly computed local optimal solutions, $V_{new}^{J+1}$, is empty, continue with step (6); otherwise set j=j+1 and go to step 3.

Step 6. Output the set of local optimal solutions $V_s$ and identify the best optimal solution from the set of $V_s$ by comparing their corresponding objective function values in set $V_s$ and selecting the one with the smallest value. And output it as the global optimal solution.

6. Dynamical Methods for Solving Unconstrained Discrete Optimization Problem

We present in this section dynamical methods for solving unconstrained discrete optimization problem (4-3).

The task of finding a globally optimal solution to the given instance (4-3) can be prohibitively difficult, but it is often possible to find a local optimal solution which is best in the sense that there is nothing better in its neighborhood. For this purpose, we need a neighborhood that can be identified. The neighborhood function N: $S \rightarrow 2^S$ is a mapping which defines for each solution y, a set of solutions, N(y), that are in some sense close to y. The set N(y) is called a neighborhood of solution y. We say x* is a local optimal solution with respect to a neighborhood N(x*) (or simply a local optimal solution whenever N(x*) is understood by context) if $UC(x) \geq UC(x^*)$ for all $x \in N(x^*)$.

Many discrete optimization problems of the form (4-3) are NP-hard. It is generally believed that NP-hard problems cannot be solved optimality within polynomial bounded computation time. There are three approaches available to tackle the discrete optimization problems of the form (4-3). The first one is the enumerative method that is guaranteed to find the optimal solution at the expense of tremendous computation efforts. Another one uses an approximation algorithm that runs in polynomial time to find a 'near' optimal solution. The other approach resorts to some type of heuristic technology or iterative improvement technique, called local search or local improvement, without any a priori guarantee in terms of solution quality or running time.

Local search is often the approach of choice to solve many discrete optimization problems. Factors such as problem size or lack of insight into the problem structure often prohibit the application of enumerative methods to practical discrete optimization problems. On the other hand, polynomial-time approximation algorithms, in spite of their performance bounds, may give unsatisfactory solutions. Nevertheless, local search provides a robust approach to obtain, in reasonable time, reasonable or perhaps high-quality solutions to practical problems. A basic version of local search algorithms is iterative improvement, which starts with some initial solution and searches its neighborhood for a solution of lower value of cost function (in the case of minimization). If such a solution is found, it replaces the current solution, and the search continues; otherwise, the current solution is a local optimal solution and the local search terminates.

We next present a basic version of local search algorithms called iterative improvement for the discrete optimization problem (4-3):

Iterative Local Improvement (Local Search) Algorithm

For discrete optimization problems (4-3), a local search algorithm proceeds from a current solution, and attempts to improve $x^k$ by looking for a superior solution in an appropriate neighborhood $N(x^k)$ around $x^k$ using the following steps.

Step 1. Initialization: choose an initial point $x^1$ and let iteration counter $k=1$.

Step 2. Improvement: consider the local improvement set $\{x \in N(x^k): C(x) < C(x^k)\}$, where $N(x^k)$ is a neighborhood around $x^k$. If the set is empty, stop, and $x^k$ is a local minimum with respect to the neighborhood $N(x^k)$; otherwise, choose a member of the set as $x^{k+1}$, increase $k=k+1$, and repeat this step.

There are two issues related to a local search algorithm.

(i). The definition of a neighborhood $N(x)$.

(ii). The mechanism to choose a $x^{k+1}$ from the set $\{x \in N(x^k): C(x) < C(x^k)\}$.

The task of finding efficient neighborhood functions for obtaining high-quality local optimal solutions is a great challenge of local search algorithms. No general rules for finding efficient neighborhood functions are currently available. Even for the same problem, there are several neighborhood functions available and different definition of neighborhood yields different results from the same local search algorithm. The design of good neighborhood functions often take advantage of the discrete structure of the study problem and are typically problem dependent. To address issue (i), clearly, an appropriate discrete neighborhood must be large enough to include some discrete variants of the current solution and small enough to be surveyed within practical computation. For notational simplicity, we will assume that all variables are subject to 0–1 constraints.

Unit neighborhood: for a given solution $x^k$, the unit neighborhood of $x^k$ is the one formed by complementing components of $x^k$ one at a time, i.e.

$$N_1(x^k) \triangleq \left\{ \text{binary } X: \sum_j |x_j - x_j^k| = 1 \right\} \quad (6\text{-}1)$$

K-change neighborhood: the k-change neighborhood generalizes the unit neighborhood by allowing complementation of up to k solution components. Specifically, $$N_1(x^k) \triangleq \left\{ \text{binary } X: \sum_j |x_j - x_j^k| \le k \right\} \quad (6\text{-}2)$$

Pairwise Interchange neighborhood: pairwise interchange neighborhood changes two binary components at a time, but in a complementary fashion.

$$N_1(x^k) \triangleq \left\{ \text{binary } X: \sum_j |x_j - x_j^k| = 2, \sum_j (x_j - x_j^k) = 0 \right\} \quad (6\text{-}3)$$

K-Interchange neighborhood: A k-interchange neighborhood changes up to k values of the solution at a time, but in a complementary fashion.

$$N_1(x^k) \triangleq \left\{ \text{binary } X: \sum_j |x_j - x_j^k| \le k, \sum_j (x_j - x_j^k) = 0 \right\} \quad (6\text{-}4)$$

For variety, the neighborhood functions can be switched during the search process.

In this invention, we also use the following three definitions of neighborhood.

Immediate neighborhood: A point, $x'$, is said to lie in the immediate neighborhood of $x$, if and only if the difference of $x'$ and $x$ can be expressed as $e_1 = [u_0, u_1, \ldots, u_n]$, where only one $u_i$ has a value of one, the rest of $e$ are zero. So the difference of a point $x$ and its immediate neighbor $x'$ is 1.

One-Way Extended Neighborhood (OWEN): A point $x'$ is said to lie in the one-way extended neighborhood of $x$, if and only if the difference between $x'$ and $x$, i.e. $x'-x$ or $x-x'$ can be expressed as $e_2 = [u_0, u_1, \ldots, u_n]$, where $u_i$ could be either 0, or 1.

Full neighborhood: A point $x'$ is said to lie in the full neighborhood of $x$, if and only if the difference of $x'$ and $x$ i.e. $x'-x$ or $x-x'$ can be expressed as $e_2 = [u_0, u_1, \ldots, u_n]$, where $u_i$ could be 0, 1, or -1.

We say a point is a local optimal solution with respect to its immediate neighborhood in the discrete space S if the point has a minimal objective function with respect to its immediate neighborhood. We say a point is a local optimal solution with respect to one-way extended neighborhood in the discrete space S if the point has a minimal objective function with respect to its one-way extended neighborhood. We say a point is a local optimal solution with respect to its full neighborhood in the discrete space S if the point has a minimal objective function with respect to its full neighborhood. The following facts are consequences from the above definitions.

Fact 1: If point $x^*$ is a local optimal solution with respect to its one-way extended neighborhood, then it is a local optimal solution with respect to immediate neighborhood.

Fact 2: If point $x^*$ is a local optimal solution with respect to its full neighborhood, then it is a local optimal solution with respect to its immediate neighborhood and a local optimal solution with respect to its one-way extended neighborhood.

Fact 3: For unconstrained discrete optimization problem (4-3), the global optimal solution of $C(x)$ must be a local optimal solution with respect to its full neighborhood.

For the discrete optimization problem (4-3), by convention, a neighborhood is referred to as an immediate neighborhood; a local optimal solution is referred to as a local optimal solution with respect to its immediate neighborhood.

For resolving the issue (ii) related to local search algorithms, there are two general iterative improvement local search algorithms to determine $x_{k+1}$ (i.e. the choice rule in step 2 of local search), Best Neighborhood Search Method The best neighborhood search method always chooses the point in a neighborhood with the greatest descent in objective function as $x_{k+1}$. This method is deterministic in obtaining a local optimal solution.

Better Neighborhood Search Method

Instead of choosing the point in a neighborhood with the greatest descent as $x_{k+1}$, the better neighborhood search method takes the first point in a neighborhood that leads a descent in objective function as $x_{k+1}$. Clearly, the better neighborhood search method is fast; however, depending on the order that the points in a neighborhood are examined, this local search method may not reach unique results; especially when $x_k$ is far away from a local optimal solution. It is obvious that this local search method has a stochastic nature.

Over the past three decades, a great number of local search algorithms have been developed and applied to a wide range of discrete optimization problems. Many of these algorithms are rather specific and tailored to certain types of discrete optimization problems. Moreover, a majority of them only effectively find local optimal solutions, but not the global one. During their search process, these algorithms usually get trapped at a local optimal solution and cannot move to another local optimal solution. To remedy this drawback and yet maintain the paradigm of neighborhood search, several modifications have been proposed but without much success. A straightforward extension of local search is to run a local search algorithm a number of times using different starting solutions and to keep the best solution found as the final solution. No major successes have been reported on this multi-start approach.

The drawback of iterative improvement local search algorithms has motivated the development of a number of more sophisticated local search algorithms designed to find better solutions by introducing some mechanisms that allow the search process to escape from local optimal solutions. The underlying 'escaping' mechanisms use certain search strategies that accept cost-deteriorating-neighborhood to make an escape from local optimal solutions possible. These are several sophisticated local search algorithms; in which we mention simulated annealing, genetic algorithm, Tabu search and neural networks.

However, it has been found in many studies that these sophisticated local search algorithms, among other problems, require intensive computational efforts and usually cannot find the globally optimal solution.

In the present invention, we develop a new systematic methodology, which is deterministic in nature, to find all the local optimal solutions of general discrete optimization problems. In addition, two dynamical methods for solving unconstrained discrete optimization problems (4-3) are developed in this invention:

a dynamical methodology for solving unconstrained discrete optimization problems with closed-form objective functions.

a dynamical methodology for solving unconstrained discrete optimization problems with black-box objective functions.

We develop in this invention several dynamical methods based on two different approaches; namely discrete-based dynamical approach and continuous-based dynamical approach. In addition, several effective methods are developed in this invention for addressing the following two important and challenging issues in the course searching for the globally optimal solution:

(i) how to effectively move (escape) from a local optimal solution and move on toward another local optimal solution; and (ii) how to avoid revisiting local optimal solutions which are already known.

6.1. Discrete-based Dynamical Approach

In this section, we develop a discrete-based dynamical approach to solve unconstrained discrete optimization problem (4-3).

To solve the unconstrained discrete optimization problem (4-3), we consider the following associated nonlinear discrete dynamical system which is described by a set of autonomous ordinary difference equations of the form $$x_{k+1}=f(x_k) \qquad (6\text{-}5)$$

where $x \in S$, a discrete state space. Equation (6-5) is known as a map or iteration. We refer to such a map as explicit since $x_{k+1}$ is given by an explicit formula in terms of $x_k$. The solution of (6-5) starting from $x_0 \in S$ is called a system trajectory. A point $x^* \in S$ is called a fixed point of the discrete dynamical system (6-5) if $x^*=f(x^*)$. A fixed point is stable if the system trajectory can be forced to remain in any neighborhood of the fixed point by choice of initial point $x_0$ sufficiently close to that fixed point.

We propose the following sufficient conditions for such nonlinear discrete dynamical systems whose certain trajectories can be employed to locate all the local optimal solutions.

(LD1)—every trajectory of the nonlinear dynamical system (6-5) converges, and converges to one of its fixed points; and (LD2)—the objective function of the discrete optimization problem decreases along every trajectory of the discrete dynamical system.

(LD3)—every local optimal solution of the discrete optimization problem (4-3) is a stable fixed point of (6-5) and vice versa.

All local optimal solutions of discrete optimization problems (4-3) can be systematically computed via certain dynamical trajectories of the associated discrete dynamical system (6-5). From these local optimal solutions, the global optimal solution can be easily obtained.

6.1.1 Hybrid Local Search Method

A discrete-based hybrid local search method for computing a local optimal solution of a discrete optimization problem described by (4-3) starting from an initial point is presented below:

Given: an initial point, say $x_0$.

Purpose: reliably compute a local optimal solution.

Step 1. Apply an effective iterative improvement local search algorithm to discrete optimization problem (4-3), starting from the initial point, say $x_0$.

Step 2. If the local search algorithm converges to a local optimal solution, then stop; otherwise, proceed to the next step.

Step 3. Use the best neighborhood search method starting from $x_0$ to continue the search process for a few steps to obtain an end point. Set the end point as the initial point and go to step 1.

6.1.2 Methods for Computing Exit Point

We next present methods for computing the exit point of a search path starting from a local optimal solution $x_s$. We note that a search path $\psi_t(x_s)$ passing through $x_s$ is a curve parameterized by the variable t with $\psi_0(x_s)=x_s$ and $\psi_t(x_s)$ lies in the search space (i.e. solution space) for all t.

A method for computing the exit point of a discrete dynamical system associated with optimization problems (4-3) starting from a know local optimal solution, termed herein the an discrete-based method for computing exit point, is presented below:

Given: a local optimal solution, say $x_s$, a pre-defined search path and the associated discrete dynamical system (6-5).

Purpose: find the corresponding exit point (EP) with respect to the pre-defined search path and the corresponding stable fixed point $x_s$ of the system (6-5).

Starting from a known local optimal solution, say $x_s$, move along the pre-defined search path to detect said exit point, which is the first local maximum of the objective function of the optimization problem (4-3) along the pre-defined search path.

6.1.3. Discrete-based Method for Computing DDP

Given a local optimal solution, say $x_s$, of the optimization problem (4-3), we develop a discrete-based dynamical method for computing the dynamical decomposition point (DDP) with respect to the corresponding stable fixed point, which is $x_s$, of system (6-5) and with respect to a pre-defined search path as follows:

Given: a local optimal solution, say $x_s$, of the discrete optimization problem (4-3) and a pre-defined search path.

Purpose: find the corresponding dynamical decomposition point (DDP) of the discrete dynamical system (6-5).

Step 1. Starting from a known local optimal solution $x_s$, move along the pre-defined search path to compute the exit point. Let the exit point be denoted as $x_{ex}$.

Step 2. Starting from $x_{ex}$, apply the best neighborhood search method one (forward) iteration to a new point, say $x_c$.

Step 3. Perform ray adjustment procedure and DDP computation:
  (i). Form a ray connecting $x_s$ and $x_c$.
  (ii). If expressions for vectors $(x_s - x_{ex})$ and $(x_c - x_{ex})$ are available, then perform (ii) (a); otherwise perform the alternative.
    (a) Compute the angle $\epsilon$ between two vectors $(x_s - x_{ex})$ and $(x_c - x_{ex})$. If $\epsilon$ is close to 0° or 180°, then $x_{ex}$ is the DDP and stop the process; otherwise proceed to the next step.
    (alternative of Step (a)) Update the search path to make the current $x_{ex}$ lie on the updated search path. Check if the three points $x_{ex}$, $x_c$ and $x_s$ lie on the updated search path. If yes, then $x_{ex}$ is the DDP and stop the process; otherwise proceed to the next step.
  (iii). Adjust $x_c$ to the point, say $x_c'$, which is the point with the first local maximum value of the objective function along the ray starting from $x_s$. If $x_c'$ is very close to $x_{ex}$, then $x_c'$ is the DDP and stop the process; otherwise proceed to the next step.

Step 4. Use $x_c'$ as the exit point, i.e. assign $x_c' \rightarrow x_{ex}$, and go to step 2.

6.1.4 EP-based Method for Finding Another Local Optimal Solution

Given a local optimal solution, say $x_s$, of the optimization problem (4-3), we develop a discrete-based exit-point-based method for finding a new local optimal solution starting from a known local optimal solution as follows:

Given: a local optimal solution, say $x_s$, of the optimization problem (4-3) and a pre-defined search path.

Purpose: find the corresponding new local optimal solution of the optimization problem (4-3).

Step 1. Move along the pre-defined search path starting from $x_s$ and apply the discrete-based method for computing exit point (EP) to the nonlinear dynamic system (6-5). If an EP is found, say $x_{ex}$, then proceed to the next step; otherwise stop the process.

Step 2. Starting from the found exit point $x_{ex}$, move along the pre-defined search path one step farther away from $x_s$ to a new point, denoted as $x_0$, (or use $x_0 = x_s + (1+\epsilon)(x_{ex} - x_s)$, where $\epsilon$ is a small number, if the expression is available).

Step 3. Apply the best neighborhood search method starting from $x_0$ to obtain an interface point, $x_{inf}$, at which an effective discrete-based (hybrid) local search method outperforms the best neighborhood search method.

Step 4. Starting from the interface point $x_{inf}$, apply the effective hybrid local search method, chosen in step 3, to find the corresponding adjacent local optimal solution.

6.1.5 DDP-based Method for Finding Another Local Optimal Solution

For the optimization problem (4-3), this invention develops a DDP-based method for finding a local optimal solution starting from a known local optimal solution. This DDP-based method, deterministic in nature, is presented as follows:

Given: a local optimal solution of the discrete optimization problem (4-3), say $x_s$, and a pre-defined search path.

Purpose: find the corresponding new local optimal solution of the optimization problem (4-3) with respect to the pre-defined search path.

Step 1. Move along the pre-defined search path starting from $x_s$ and apply a method to compute the corresponding dynamical decomposition point (DDP), say $x_{ddp}$. If a DDP cannot be found, then stop the process; otherwise proceed to the next step.

Step 2. Starting from the found DDP, move along the updated search path that is used to adjust the last exit point $x_{ex}$ one step farther away from $x_s$ for a few iterations to a point, denoted as $x_0$, (or use $x_0 = x_s + (1+\epsilon)(x_{ddp} - x_s)$, where $\epsilon$ is a small number, if the expression is available).

Step 3. Apply the best neighborhood search method to the associated discrete nonlinear dynamic system (6-5) starting from $x_0$ to obtain an interface point, $x_{inf}$, at which an effective hybrid local search method outperforms the best neighborhood search method.

Step 4. Starting from the interface point $x_{inf}$, apply the effective hybrid local search method, chosen in step 3, to find the corresponding adjacent local optimal solution.

6.1.6. Dynamic Discrete-based Method for Finding all the Tier-one Local Optimal Solutions For the optimization problem (4-3), we develop in the following a dynamical method for finding all the tier-one local optimal solutions, starting from a known local optimal solution.

Given: a local optimal solution, say $x_s^0$ of the optimization problem (4-3).

Purpose: find all tier-one local optimal solutions of $x_s^0$.

Step 1. Initialize the set of tier-one local optimal solutions $V_s = \{x_s^0\}$ and define a set of search paths $S_i$ for $x_s^0$ i=1,2, . . . , m. Set i=1.

Step 2. Starting from $x_s^0$ and moving along each search path $S_i$, apply the discrete-based EP-based method (or the DDP-based method) to find the corresponding local optimal solution of the optimization problem (4-3) (i.e. the corresponding stable fixed point (s.f.p.) of the discrete optimization problem (6-5)). If a local optimal solution is found, then let it be denoted as $x_s^i$ and proceed to the next step; otherwise, go to step 4.

Step 3. Check if $x_s^i$ has been found before, i.e. $x_s^i \in V_s$. If not found, set $V_s = V_s \cup \{x_s^i\}$.

Step 4. Set i=i+1.

Step 5. Repeat step 2 through step 4 until i>m.

Step 6. Output the set of tier-one local optimal solutions, $V_s$, of $x_s^0$.

6.1.7. Dynamic Discrete-based Method for Finding all the Local Optimal Solutions We develop in the following a dynamical discrete-based method for finding all the local optimal solutions of a discrete optimization problem (4-3), starting from a given initial point.

Given: an initial point, say $x_0$.

Purpose: (i) find all local optimal solutions of the discrete optimization problem (4-3).

(ii) find the global optimal solution of the discrete optimization problem (4-3).

Step 1. Starting from $x_0$, apply an effective (hybrid) search method to find a local optimal solution, say $x_s^0$.

Step 2. Set j=0. Initialize the set of local optimal solutions $V_s = \{x_s^0\}$, the set of tier-j local optimal solutions $V_{new}^j = \{x_s^0\}$.

Step 3. Initialize the set of tier-(j+1) local optimal solutions $V_{new}^{J+1} = \{\phi\}$.

Step 4. For each local optimal solution in $V_{new}^J$, say $x_s^J$, find its all tier-one local optimal solutions.

(i). Define a set of search paths $S_i^J$ for $x_s^J$, i=1,2, . . . , $m_j$. Set i=1.

(ii). Starting from $x_s^J$ and moving along each search path $S_i^J$ apply the EP-based method (or the DDP-based method) to find the corresponding local optimal solution of the optimization problem (4-3) (i.e. the corresponding stable fixed point of the nonlinear dynamical system (6-5)). If a local optimal solution is found, then let it be denoted as $x_{s,J}^i$ and proceed to the next step; otherwise, go to the step (iv).

(iii). Check if $x_{s,J}^i$ has been found before, i.e. $x_{s,J}^i \in V_s$. If not found, set $$V_s = V_s \cup \{x_{s,j}^i\}, V_{new}^{j+1} = V_{new}^{j+1} \cup \{x_{s,j}^i\}.$$

(iv). Set i=i+1.

(v) Repeat steps (ii) through (iv) until i>$m_j$.

Step 5. If the set of all newly computed local optimal solutions, $$V_{new}^{j+1},$$

is empty, continue with step (6); otherwise set j=j+1 and go to step (3).

Step 6. Output the set of local optimal solutions $V_s$ and identify the global optimal solution from the set $V_s$ by comparing their corresponding objective function values in set $V_s$ and select the one with the smallest value. And output it as the found global optimal solution.

6.2. Continuous-based Dynamical Approach

In this embodiment of the invention, we develop dynamical methods using a continuous-based dynamical approach to solve the unconstrained discrete optimization problem (4-3) with an analytical closed-form objective function. The basic idea of the dynamical method is to solve an equivalent optimization problem first in the continuous state space and then, if necessary, solve it in the discrete state space. For the optimization problem (4-3) with a black-box objective function, the applicability of the continuous-based approach is conditional and is presented in the following section.

Equivalent Approach

We propose to find transformations to convert the unconstrained discrete optimization problem (4-3) into the following equivalent continuous optimization problem defined in the Euclidean space $$\min UC_{eq}(x) x \in R^n \tag{6-6}$$

where $UC_{eq}(x)$ is a continuous function defined in the Euclidean space $R^n$, n is the number of the degree of freedom of the original state space S. We propose that the transformation must satisfy the following guidelines:

(G1) Both the original optimization problem (4-3) and the equivalent optimization problem (6-6) share the same global optimal solution (i.e. $x \in S$ is the global optimal solution of $UC(x)$ if and only if $x \in R^n$ is the global optimal solution of $UC_{eq}(x)$)

(G2) Both the original optimization problem (4-3) and the equivalent optimization problem (6-6) share as many the same local optimal solutions as possible.

With the equivalent approach, we find the global optimal solution of (4-3) via the global optimal solution of the equivalent nonlinear optimization problem (6-6). Hence, the techniques developed for finding the global optimal solution and all the local optimal solutions of an optimization problem of the form (6-6) can thus be applied to solving discrete optimization problem (4-3).

We first develop techniques to construct transformations that satisfy the above two guidelines as described below.

Transformation by Appending a Modulator

An equivalent objective function $UC_{eq}(x)$ can be constructed as follows.

$$UC_{eq}(x) = UC(x) + \mu \prod_{i=1}^{n} \sin^2(\pi x_i) \quad x \in R^n \tag{6-7}$$

where the coefficient $$\mu > \frac{L}{2}$$

and L is the Lipschitz constant of the original objection function $UC(x)$.

The transformation technique is instrumental in transforming a discrete optimization problem (4-3) into a continuous optimization problem (6-7). This transformation has the advantage of being differentiable all over the state space if $UC(x)$ is differentiable. The computation procedure is easy and straightforward, and a theoretical analysis of the transformation is possible. It can be shown that $UC_{eq}(x)$ is a continuous function, and that $UC_{eq}(x)$ has the same global optimal point as the original problem (4-3). However, the transformation may introduce new local optimal solutions that do not belong to the original problem. This disadvantage causes considerable extra computation burden in finding the global optimal solution via computing local optimal solutions of the transformed problem (6-7). In addition, this transformation is applicable only for the class of discrete optimization problems (4-3) which has an analytical closed-form objective function.

In this embodiment of the invention, we develop another new transformation that meets the guidelines (G1) and (G2) proposed above.

Piecewise Linear Transformation

Given the original problem (4-3), this invention develops the following transformation:

$$C_{eq}(x) = \begin{cases} C(x) \text{ when } \lfloor x \rfloor = \lceil x \rceil \\ C\left(\lfloor x \rfloor + \frac{C(\lceil x \rceil) - C(\lfloor x \rfloor)}{\text{dist}(\lceil x \rceil - \lfloor x \rfloor)} \text{dist}(x - \lfloor x \rfloor)\right) \text{ when} \lfloor x \rfloor \neq \lceil x \rceil \end{cases} \quad (6-8)$$

where: dist(x, y) is the distance between x and y. In most cases, the Euclidean distance is used. $x=(x_1, x_2 \ldots, x_n) \in R^n$, $\lceil x \rceil = (\lceil x_1 \rceil, \lceil x_2 \rceil, \ldots, \lceil x_n \rceil)$ and $\lceil x_i \rceil$ denotes the smallest integer that are greater than or equal to $x_i$, $\lfloor x \rfloor = (\lfloor x_1 \rfloor, \lfloor x_2 \rfloor, \ldots, \lfloor x_n \rfloor)$ and $\lfloor x_i \rfloor$ denotes the largest integer that are smaller than or equal to $x_i$ This transformation has several desired properties described as follows.

Property 1: $C_{eq}(x)$ is almost continuous everywhere.

Lemma 1: Given a point $x_0$ and its one-way extended neighbor point $x_1$. Define a connected region which is formed by a unit open box described by $(x_0, x_1)$ and two points $x_0$ and $x_1$. Then $x_0$ or $x_1$ will be either a maximal point or minimal point of the transformed objective function $C_{eq}(x)$ within the connected region.

Property 2: Local optimal solutions of $UC_{eq}(x)$ are identical to the local optimal solutions with respect to one-way extended neighborhood (OWEN) of the original problem (4-3).

Property 3: $UC_{eq}(x)$ has the identical global optimal solution as the original optimization problem (4-3).

The three properties derived above assert that our developed transformation can meet the guidelines (G1) and (G2). Property 2 states that the transformed problem has no more local optimal solutions than the original problem. In fact, the local optimal solutions of the transformed problem are that of the original problem with respect to one-way extended neighborhood instead of immediate neighborhood. The transformed problem generally has fewer local optimal solutions than the original problem (4-3). This is a desirable property, which can reduce the computation efforts required in the search for the global optimal solution by skipping shallow local optimal solutions. This transformation gives us the leverage to apply our DDP-based method to effectively solve discrete optimization. Property 3 states that both the transformed problem and the original problem share the same global optimal solution. This transformation applies to the optimization problem (4-3) which has an analytical closed-form objective function. It also applies to the optimization problem (4-3) which has a black-box objective function, but the distance between any two points in the state space is well defined.

Extended Approach

We have so far focused on the continuous-based dynamical approach using the transformation. Another continuous-based approach is developed by employing a direct extension of the discrete solution space of the optimization problem (4-3) into continuous solution space but maintaining the same form of objective function. The resulting problem, termed the extended continuous optimization problem, becomes $$\text{Minimize UC}(x) \quad (6-9)$$

where the objective function UC: $R^n \to R$ has a closed-form expression, n is the number of the degree of freedom of the original solution space S. It is obvious that the optimal solutions of the original problem (4-3) and that of the extended optimization problem (6-9) are likely to be different, but may not be far apart from each other.

One can solve the original optimization problem (4-3) via solving an approximated optimization problem, such as the extended optimization problem (6-9), in the first stage, and then in the second stage solving the original optimization problem (4-3) using the results obtained from the first stage as initial conditions. The solutions obtained from this two-stage approach are local optimal solutions of the original optimization problem (4-3).

We note that with the introduction of a transformation on the objective function, the equivalent approach transforms the discrete optimization problem (4-3) into the form of (6-6) that has the same solution space as that of the original problem (4-3). With the introduction of the extended solution space (i.e. a continuous solution space) with the same objective function, the extended approach transforms the discrete optimization problem (4-3) into the form of (6-9). In addition, for clarity of explanation, we put the equivalent continuous optimization problem (6-6) as well as the extended continuous optimization problem (6-9) into the following general form:

$$\text{Minimize UC}(x) \quad (6-10)$$

where the objective function UC: $R^n \to R$ has a closed-form expression, n is the number of the degree of freedom of the original solution space S. The solution space becomes continuous.

The transformed optimization problem (6-10) belongs to the unconstrained continuous optimization problem described by (4-1). A nonlinear dynamical system associated with the optimization problem (6-10) satisfying conditions (LC1)–(LC3) of section 5 can be constructed, and put it into the following general form:

$$\dot{x} F^U(x) \quad (6-11)$$

We will develop dynamical methods to systematically compute all the local optimal solutions of the discrete optimization problem (4-3) by using the continuous approach to solve either the equivalent optimization problem (6-6) or the extended optimization problem (6-9), which is put into the general form (6-10).

6.2.1 Hybrid Local Search Method

A hybrid local search method for obtaining a local optimal solution for an unconstrained discrete optimization problem (4-3) in the continuous solution space starting from an initial point is presented below:

Given: an initial point, say $x_0$.

Purpose: reliably find a local optimal solution of the unconstrained discrete problem (4-3).

Step 1. Starting from the initial point, say $x_0$, apply an effective local search algorithm to the unconstrained discrete problem (4-3).

Step 2. If the local search algorithm converges to a local optimal solution, then go to step 4; otherwise, set the end point as the initial point, namely $x_0$, and proceed to the next step.

Step 3. Integrate the nonlinear dynamical system (6-11) staring from said initial point $x_0$ for a few time-steps to obtain an end point. Set the end point as the initial point and go to step 1.

Step 4. (for the extended approach) Round off the computed continuous local optimal solution, namely $x_s$, to m, say 2, closest discrete points $x_{s1}', \ldots x_{sm}'$. Two options are available; either select the point with the minimum value as the local optimal solution and stop the process; or use them as initial points for step 5.

Step 5. (for the extended approach) Apply the better neighborhood local search to each initial point respectively to obtain m local optimal solutions $x_{s1}, \ldots, x_{sm}$. Output the point with the minimum value as the local optimal solution of the original problem (4-3).

6.2.2 Continuous-based Method for Computing Exit Point

A continuous-based method for computing the exit point of the continuous dynamical system (6-11) associated with the an optimization problem (4-3) starting from a known local optimal solution, termed herein the method for computing exit point, is presented below:

Given: a local optimal solution, say $x_s$, of the discrete optimization problem (4-3), a pre-defined search path and the associated nonlinear continuous dynamical system (6-11).

Purpose: find the corresponding exit point (EP) of the dynamical system (6-11) with respect to the pre-defined search path and to the corresponding stable equilibrium point, $x_s$, of the dynamical system (5-7)

Starting from a known local optimal solution, say $x_s$, move along the pre-defined search path to detect said exit point, which is the first local maximum of the continuous objective function (6-10) along the pre-defined search path.

Another method for computing exit point: move along the search path starting from $x_s$, and at each time-step, compute the inner-product of the derivative of the search path and the vector field of the nonlinear dynamic system (6-11). When the sign of the inner-product changes from positive to negative, say between the interval $[t_1, t_2]$, then either the point which is the search path at time $t_1$ or the point which is the search path at time $t_2$ can be used to approximate the exit point.

6.2.3 Method for Computing DDP

Given a local optimal solution of the optimization problem (4-3), say $x_s$, we develop a continuous-based method for computing the DDP of the associated nonlinear dynamical system (6-11) with respect to the stable equilibrium point $x_s$ of system (6-11) and with respect to a pre-defined search path is presented as follows:

Step 1. Starting from a known local optimal solution $x_s$, move along a pre-defined search path, say $\phi_t(x_s)$, to compute the exit point of the quasi-stability boundary of $x_s$ of the system (6-11). Let the exit point be denoted as $x_{ex}$.

Step 2. Starting from $x_{ex}$, compute the minimal distance point (MDP) by the following steps:
  (i). Integrate the associated nonlinear dynamic system (6-11) for a few time-steps; letting the end point be denoted as the current exit point.
  (ii). Draw a ray connecting the current exit point and the local optimal solution, say $x_s$, and replace said current exit point with a corrected exit point, which is the first local maximal point of the continuous objective function expressed in (6-10) along said ray, starting from $x_s$, and assign this corrected exit point to said exit point, namely $x_{ex}$.
  (iii). Repeat the step (i) and (ii) until the norm of vector field (6-10) at said current exit point obtained in step (ii) is smaller than a threshold value, i.e. $\|F^u(x_{ex})\| \leq \epsilon$. Then said point is declared as a minimal distance point (MDP), say $x_d^0$.

Step 3. Using said MDP $x_d^0$ as an initial guess and solving the set of nonlinear algebraic equations of said vector field $F^U(x)=0$ of system (6-11), wherein a solution is the DDP, say $x_{ddp}$, with respect to the $x_s$ of the associated dynamical system (6-11) and with respect to said search path $\phi_t(x_s)$.

6.2.4. EP-based Method for Finding Another Local Optimal Solution

For the optimization problem (4-3), this invention develops an exit-point-based (EP-based) method for finding a local optimal solution starting from a known local optimal solution.

Given: a local optimal solution, say $x_s$ of the discrete optimization problem (4-3).

Purpose: find a new local optimal solution of the discrete optimization problem (4-3).

Step 1. Starting from the known local optimal solution $x_s$, apply the method for computing exit point (EP) to the nonlinear dynamic system (6-11) to compute an EP, denoted as $x_{ex}$.

Step 2. Set $x_0 = x_s + (1+\epsilon)(x_{ex} - x_s)$ where $\epsilon$ is a small number.

Step 3. Starting from $x_0$, conduct a transitional search by integrating nonlinear dynamic system (6-11) to obtain the corresponding system trajectory until it reaches an interface point, $x_{inf}$ at which an effective (hybrid) local search method outperforms the transitional search.

(Alternate to Step 3) Round off $x_0$ in a direction away from $X_s$, but close to the direction $(x_{ep} - x_s)$, to a new point $x_0'$. Starting from $x_0'$, apply the best neighborhood search method to obtain an interface point, $x_{inf}$ at which an effective (hybrid) local search method outperforms the best neighborhood search.

Step 4. Starting from the interface point $x_{inf}$ apply the (hybrid) local search method to the problem (4-3), chosen in step 3, to find an adjacent local optimal solution.

6.2.5. DDP-based Method for Finding Another Local Optimal Solution

For the optimization problem (4-3), this invention develops a DDP-based method for finding a local optimal solution starting from a known local optimal solution.

Given: a local optimal solution, say $x_s$ of the optimization problem (4-3).

Purpose: find a new local optimal solution of the optimization problem (4-3).

Step 1. Starting from a known local optimal solution $x_s$, apply the method for computing dynamic decomposition point (DDP) to system (6-11) for finding a DDP, denoted as $x_{ddp}$.

Step 2. Set $x_0 = x_s + (1+\epsilon)(x_{ddp} - x_s)$ where $\epsilon$ is a small number.

Step 3. Starting from $x_0$, conduct a transitional search by integrating dynamic system (6-11) to obtain the corresponding system trajectory until it reaches an interface point, $x_{inf}$ at which an effective (hybrid) local search method outperforms the transitional search.

(Alternate Step 3) Round off $x_0$ in a direction away from $x_s$, but close to the direction $(x_{ddp}-x_s)$, to a new point $x_0'$. Starting from $x_0'$, apply the best neighborhood search method to obtain an interface point, $x_{inf}$, at which an effective (hybrid) local search method outperforms the best neighborhood search.

Step 4. Starting from the interface point $x_{inf}$, apply the effective (hybrid) local search method to the problem (4-3), chosen in step 3, to find the corresponding local optimal solution.

6.2.6. Dynamical Methods for Finding all Tier-one Local Optimal Solutions

For the discrete optimization problem (4-3), this invention develops two groups of continuous-based methods for finding all tier-one local optimal Solutions. The first group is continuous-EP-based while the second group is continuous-DDP-based.

Continuous-EP-based Method

Given: a local optimal solution, say $x_s^0$ of the discrete optimization problem (4-3).

Purpose: find all tier-one local optimal solution of $x_s^0$ of the discrete optimization problem (4-3).

Step 1. Initialize the set of tier-one local optimal solutions $V_s=\{\phi\}$ and define a set of search paths $S_i$ for $x_s^0$, $i=1,2,\ldots,m$. Set $i=1$.

Step 2. For each search path $S_i$ starting from $x_s^0$, compute the corresponding local optimal solution.

(i). Apply the EP-based method to system (6-11) to find another local optimal solution. If a local optimal solution is found, then let it be denoted as $x_s^i$ and proceed to the next step; otherwise go to step (iii).

(ii) Check if $x_s^i$ has been found before, i.e. $x_s^i \in V_s$. If not found, set $V_s=V_s \cup \{x_s^i\}$.

(iii). Set $i=i+1$ (iv) Repeat steps (i) through (iii) until $i>m$.

Step 3. Output the set of tier-one local optimal solutions, $V_s$, of $x_s^0$.

Continuous-DDP-Based Method

Given: a local optimal solution, say $x_s^0$ of the discrete optimization problem (4-3).

Purpose: find all tier-one local optimal solutions of $x_s^0$ of the discrete optimization problem (4-3).

Step 1. Initialize the set of dynamical decomposition point $V_{ddp}=\{\phi\}$ and set of tier-one local optimal solutions $V_s=\{\phi\}$.

Step 2. Define a set of search paths $S_i$ for $x_s^0$, $i=1,2,\ldots,m_j$. And set $i=1$.

Step 3. For each search path $S_i$ starting from $x_s^0$, compute its corresponding local optimal solution using the following steps (i). Apply the method for computing dynamical decomposition point (DDP) to system (6-11) to find the corresponding DDP. If a DDP is found, proceed to next step; otherwise, go to step (vi).

(ii). Let the found DDP be denoted as $x_{ddp,i}$, check if whether belongs to the set $V_{ddp}$, i.e., $x_{ddp,i} \in V_{ddp}$. If it does, go to step (vi); otherwise set $V_{ddp}=V_{ddp} \cup \{x_{ddp,i}\}$ and proceed to the step (iii).

(iii). Set $x_{0,i}=x_s^0+(1+\epsilon)(x_{ddp,i}-x_s^0)$, where $\epsilon$ is a small number.

(iv). Starting from $x_{0,i}$, conduct a transitional search by integrating dynamic system (6-11) to obtain the corresponding system trajectory until it reaches an interface point, $x_{inf,i}$, at which an effective hybrid local search method outperforms the transitional search.

(Alternative of Step (iv): Round off the point $x_{0,i}$ in a direction away from $x_s^0$, but close to the direction $(x_{ddp,i}-x_s^0)$, to a discrete point, say $x_{0,i}$, and apply the best neighborhood search method designed for problem (4-3) to obtain an interface point, $x_{inf,i}$, where an effective hybrid local search method outperforms the best neighborhood search method.

(v). Starting from the interface point $x_{inf,i}$, apply the effective hybrid local search method, chosen in step (iv), to find the corresponding local optimal solution with respect to $x_{ddp,i}$, denoted as $x_s^i$. And set $V_s=V_s \cup \{x_s^i\}$.

(vi). Set $i=i+1$.

(v) Repeat steps (i) through (vi) until $i>m$.

Step 4. Output the set of tier-one local optimal solutions, $V_s$, of $x_s^0$.

6.2.7 Methods for Finding all Local Optimal Solutions

For the discrete optimization problem (4-3), this invention develops two dynamical methods for finding all the local optimal solutions. The first method is a continuous-EP-based method while the second method is a continuous-DDP-based method.

Continuous-EP-based Method

Given: an initial point, say $x_0$.

Purpose: (i) find all the local optimal solutions of the discrete optimization problem (4-3).

(ii) find the global optimal solution of the discrete optimization problem (4-3).

Step 1. Starting from $x_0$, apply an effective (hybrid) search method to the discrete optimization problem (4-3) for finding a local optimal solution, say $x_s^0$.

Step 2. Set $j=0$. Initialize the set of local optimal solutions $V_s=\{x_s^0\}$, the set of tier-j local optimal solutions $$V_{new}^j = \{x_s^0\}.$$

Step 3. Initialize the set of tier-(j+1) local optimal solutions $$V_{new}^{j+1} = \{\phi\}.$$

Step 4. For each local optimal solution in $V_{new}^J$, say $x_s^J$, find its all tier-one local optimal solutions.

(i). Define a set of search paths $S_i^J$ for $x_s^J$, $i=1,2,\ldots,m_j$ and set $i=1$.

(ii). For each search path $S_i^J$ starting from $x_s^J$, apply the EP-based method to find another local optimal solution. If a local optimal solution is found, then let it be denoted as $x_{s,i}^J$ and proceed to the next step; otherwise, go to step (iv).

(iii). Check if $$x_{s,i}^j$$

has been found before, i.e.

$x_{s,j}^i \in V_s$.

If not found, set $V_s = V_s \cup \{x_{s,j}^i\}$ and $V_{new}^{j+1} = V_{new}^{j+1} \cup \{x_{s,j}^i\}$.

(iv). Set i=i+1.
(v) Repeat steps (ii) through (iv) until i>$m_j$.

Step 5. If the set of all newly computed local optimal solutions, $V_{new}^{j+1}$, is empty, continue with step (6); otherwise set j=j+1 and go to step (3).

Step 6. Output the set of local optimal solutions $V_s$ and identify the global optimal solution from the set of $V_s$ by comparing their corresponding objective function values in set $V_s$ and selecting the one with the smallest value. And output it as the global optimal solution.

DDP-based Method

Given: an initial point, say $x_0$.

Purpose: (i) find all the local optimal solutions of the discrete optimization problem (4-3).
(ii) find the global optimal solution of the discrete optimization problem (4-3).

Step 1. Starting from $x_0$, apply an effective hybrid local search method to the discrete optimization problem (4-3) for finding a local optimal solution, say $x_s^0$.

Step 2. Set j=0. Initialize the set of local optimal solutions $V_s = \{x_s^0\}$, the set of tier-j local optimal solutions $V_{new}^j = \{x_s^0\}$, and the set of found dynamic decomposition points $V_{ddp} = \{\phi\}$.

Step 3. Initialize the set of tier-(j+1) local optimal solutions $V_{new}^{j+1} = \{\phi\}$.

Step 4. For each local optimal solution in $V_{new}^j$, say $x_s^J$, find its all tier-one local optimal solutions by the following steps.

(i). Define a set of search paths $S_i^j$ for $x_s^J$, i=1,2, ..., $m_j$ and set i=1.

(ii) For each search path $S_i^J$ starting from $x_s^J$, apply an effective method to system (6-11) find the corresponding dynamical decomposition point (DDP). If a DDP is found, proceed to the next step; otherwise, go to the step (viii).

(iii). Letting the found DDP be denoted as $x_{ddp,i}^j$, check whether it belongs to the set $V_{ddp}$, i.e., $x_{ddp,i}^j \in V_{ddp}$.

If it does, go to step (viii); otherwise set $V_{ddp} = V_{ddp} \cup \{x_{ddp,i}^j\}$ and proceed to the step (iii).

(iv). Set $x_{o,i}^j = x_s^j + (1+\varepsilon)(x_{ddp,i}^j - x_s^j)$, where $\epsilon$ is a small number.

(v). Starting from $x_{0,i}^j$, conduct a transitional search by integrating the nonlinear dynamic system (6-11) to obtain the corresponding system trajectory until it reaches an interface point, $x_{inf,i}^j$, at which an effective hybrid local search method outperforms the transitional search.

(Alternative of Step v): Round off the point $x_{0,i}^j$ in a direction away from $x_s^j$, but close to the direction $(x_{ddp,i}^j - x_s^j)$, to a discrete point, say $x_{0,i}^{'j}$, and apply the best neighborhood search method designed for problem (4-3) to obtain an interface point $x_{inf,i}^j$, where an effective hybrid local search method outperforms the best neighborhood search method.

(vi). Starting from the interface point $$x_{inf,i}^j,$$

apply the effective hybrid local search method, chosen in step (v), to the discrete optimization problem (4-3) for finding the corresponding local optimal solution, denoted as $$x_{s,j}^i.$$

(vii). Check if $$x_{s,j}^i$$

has been found before, i.e.

$$x_{s,j}^i \in V_s.$$

If not found, set $$V_s = V_s \cup \{x_{s,j}^i\}, V_{new}^{j+1} = V_{new}^{j+1} \cup \{x_{s,j}^i\}.$$

(viii). Set i=i+1.
(ix) Repeat steps (ii) through (viii) until i>$m_j$.
Step 5. If the set of all newly computed local optimal solutions, $$V_{new}^{j+1},$$

is empty, continue with step (6); otherwise set j=j+1 and go to step (3).

Step 6. Output the set of local optimal solutions $V_s$ and identify the global optimal solution from the set of $V_s$ by comparing their corresponding objective function values in set $V_s$ and selecting the one with the smallest value. And output it as the global optimal solution.

7. Dynamical Methods for Solving Constrained Discrete Optimization Problem

We present, in this section, dynamical methods for solving the constrained discrete optimization problem (4-4).

The level of difficulty in solving the constrained discrete optimization problem (4-4) depends on the structure of the objective function C(x), the solution space S and the feasible set FS. Specifically, it depends on the difficulty to express the element in FS, the size of FS, and the difficulty to systematically enumerate the elements of FS.

For a discrete optimization problem defined by (4-4), a local search algorithm proceeds from a current solution, $x^k \in FS$, and attempts to improve $x^k$ by looking for a superior solution in an appropriate neighborhood $N(x^k)$ around $x^k$ using the following steps.

Step 1. Initialization: choose an initial point $x^1 \in FS$ and let iteration counter k=1.

Step 2. Improvement: consider the local improvement set $\{x \in FS \cap N(x^k): C(x) < C(x^k)\}$, where $N(x^k)$ is a neighborhood around $x^k$. If the set is empty, stop, and $x^k$ is a local minimum with respect to the neighborhood $N(x^k)$; otherwise, choose a member of the set as $x^{k+1}$, increase k=k+1, and repeat this step.

There are three issues related to a local search algorithm.
(i). The definition of a neighborhood N(x).
(ii). The way to choose a $x_{k+1}$ from the set $\{\in FS \cap N(x^k): C(x) < C(x^k)\}$.
(iii). How to obtain a feasible solution to commence the step 1?

The first two issues are similar to that of unconstrained discrete optimization problem (4-3). To handle constraints, the best neighborhood search method is modified as a constrained best neighborhood search method which only chooses from among a set of feasible neighbors (the neighbors that satisfy the constraints) the one with the greatest descent in objective function as $x_{k+1}$ Likewise, the better neighborhood local search method is modified as a constrained better neighborhood local search method which only chooses as $x_{k+1}$, the first feasible neighbor (the neighbor that satisfies the constraints) that leads a descent in objective function. Hence, by applying either constrained best neighborhood search or constrained better neighborhood search, one can obtain $x_{k+1} \in FS$.

To address the issue (iii), when no feasible solution at all is known, we may adopt the following approach to find a feasible point.

Step 1. Initialization: choose an initial point $x^1$ and check if $x^1 \in FS$? If it does, stop and we found a feasible solution to commence the local search; otherwise let iteration counter k=1.

Step 2. Feasibility improvement: consider the following infeasibility improvement set $\{x \in N(x^k): d(x) < d(x^k)\}$, where function d(x) measures the infeasibility of solution x. If the set is empty, stop and output a warning message to indicate that a feasible solution cannot be found. If there exists a $x^* \in N(x^k)$ and $d(x^*)=0$, stop and $x^*$ is a feasible solution. Otherwise, choose a member of the set as $x^{k+1}$, increase k=k+1, and repeat this step.

Constrained Solution-space Approach

For solving constrained discrete optimization problem (4-4), we develop dynamical methods based on the following constrained solution-space approach, which is composed of three stages:

Stage 1: compute a local optimal solution, which lies in a connected feasible component.

Stage 2: find all the local optimal solutions located in the connected feasible component.

Stage 3: find another connected feasible component. If no one can be found, stop the process; otherwise, go to stage 2.

We term this approach, constrained solution-space approach because the search for all the local optimal solutions is performed only in the feasible components of the solution-space.

In this section, we develop a discrete-based dynamical methods to solve constrained discrete optimization problems that satisfy equation (4-5), in which the objective function C: S→R can be either a closed-form expression or a black-box expression, and the constraint function vector G: S→$R^m$ has closed-form expression. Stage 2 of the discrete-based dynamical methods, we develop a discrete-based approach to find all the local optimal solutions located in each feasible component. Stage 3 of the dynamical methods, we develop a continuous-based approach to find all the connected feasible components.

Without loss of generality, we consider the following optimization problem with equality constraints:

Minimize C(x)  (7-1)

Subject to $h_i(x)=0, i \in I=\{1,2,\ldots,l\}$  (7-2)

Under some generic conditions, it can be shown that the following feasible set, or termed feasible component $M=\{x \in R^n; H(x) \hat{=} (h_1(x), h_2(x), \ldots, h_l(x))^T = 0$ is a smooth manifold. In general, the feasible set M can be very complicated with several isolated (path-connected) feasible components; in other words, the feasible set M can be expressed as a collection of several isolated feasible components $$M = \sum_k M_k$$

where each $M_k$ is a path-connected feasible component which may contain multiple local optimal solutions of the constrained optimization problem (7-1).

We develop a discrete-based approach to find all the local optimal solutions located in each feasible component. Similar to the discrete-based approach developed in this invention for solving unconstrained discrete optimization problem (4-3), we consider the following associated nonlinear discrete dynamical system:

$x_{k+1}=f(x_k)$  (7-3)

When $x_k \in S$, the solution space of (7-3) is discrete. The discrete dynamical system satisfies the three conditions (LD1)–(LD3) stated in Section 6. We will develop dynamical methods to systematically compute all local optimal solutions of discrete optimization problems (4-5) inside a feasible component via certain dynamical trajectories of the associated discrete dynamical system (7-3).

7.1 Methods for Finding a Feasible Point

In this patent, we will use a dynamical trajectory-based method described in copending application Ser. No. 09/849,213, filed May 4, 2001, and entitled "DYNAMICAL METHOD FOR OBTAINING GLOBAL OPTIMAL SOLUTION OF GENERAL NONLINEAR PROGRAMMING PROBLEMS", Inventor Dr. Hsiao-Dong Chiang, which is incorporated herein by reference, to perform the task of systematically locating all the feasible components of (7-2) based on some of the trajectories of the nonlinear dynamical system described by the following general form:

$\dot{x}=F(x)$  (7-4)

To construct nonlinear dynamical systems for performing such task, we propose the following guidelines:

(g1) Every system trajectory of (7-4) converges to one of its equilibrium manifolds; and (g2) A set is a (path-connected) feasible component of the set of constraint equations (7-2) if and only if the set is a stable equilibrium manifold of (7-4)

One example of nonlinear dynamical systems satisfying conditions (g1) and (g2) for locating all the feasible components of (7-3) is the following:

$\dot{x}=-DH(x)^T H(x)$  (7-5)

Two methods have been developed for finding a feasible point. The first one is trajectory-based method while the second one is a hybrid local search method.

Trajectory-based Method for Finding a Feasible Point

We next present the algorithm for locating a feasible component of (7-2) starting from an infeasible point as follows.

Given: an initial point, say $x_0$, which is infeasible.
 Purpose: find a feasible point, which satisfies the set of constraint equations (7-3).

Integrate the dynamic system (7-4) starting from $x_0$ and the resulting trajectory will converge to a point, located in a stable equilibrium manifold, which is a feasible point of (7-2).

Hybrid Method for Finding a Feasible Point

We next present a hybrid method, incorporating the global convergence property of the trajectory-based method and the speed of a local search method, for finding a feasible point of constraint equations (7-3).

Given: an initial point, say $x_0$, which is infeasible.
 Purpose: find a feasible point, which satisfies the set of constraint equations (7-3).
 Step 1. Apply an effective iterative improvement local search algorithm starting from $x_0$. If the local search algorithm converges to a feasible point, then stop; otherwise, proceed to the next step.
 Step 2. Integrate the dynamical system (7-4) starting from $x_0$ for a few time-steps. If the resulting trajectory converges to a feasible point, then stop; otherwise, set the end point as the initial point, namely $x_0$, and go to step 1.

7.2 A Local Search Method

A Lagrange-based method for obtaining a local optimal solution of a discrete optimization problem (4-5) starting from an infeasible point is developed.

By introducing the slack variable y to convert the inequality constraints to the equality constraints, it follows:

$g(x, y)=G(x)+y^2=0$  (7-6)

A Lagrangian function can be constructed as follows.

$L(x,\lambda)=c(x)+\lambda^T g(x, y)$  (7-7)

It is known that if $(x^*, \lambda^*)$ constitutes a saddle point of the Lagrange function (7-7), then $x^*$ is a local optimal solution of the discrete optimization problem (4-5). In this case, a gradient operator $\Delta_x L(x,\lambda)$ is defined as follows.

Definition. A difference gradient operator $\Delta_x L(x,\lambda)$ is defined as follows:
$\Delta_x L(x,\lambda)=(\delta_0, \delta_2, \ldots, \delta_m) \in \{-1,0,1\}^m$, where $$\sum_{i=1}^{m} |\delta_i| = 1,$$

i.e. at most one $\delta_i$ is non-zero, and $L(x-\Delta_x F(x,\lambda)) \leq L(x,\lambda)$ is satisfied. Furthermore, define $\Delta_x L(x,\lambda)=0$ if for any x' that differs from x by at most value 1 of one variable, $L(x,\lambda) \leq L(x',\lambda)$.

Hence, $\Delta_x L(x,\lambda)$ always points to the direction in which the objective function descends, and $\Delta_x L(x,\lambda)$ moves x to its one neighbor, say x', that has a lower value in $L(x,\lambda)$. If such a x' does not exist, then $\Delta_x L(x,\lambda)=0$.

With this definition, the difference gradient operator $\Delta_x L(x,\lambda)$ can be represented as:

$$\Delta_x L(x, \lambda) = \begin{cases} x' - x, & x' \in \{\text{Neighbor of } x \text{ and } L(x', \lambda) \leq L(x, \lambda)\} \\ 0 & \text{if otherwise} \end{cases} \quad (7\text{-}8)$$

We note that $\Delta_x L(x,\lambda)$ is not unique, as long as $\Delta_x L(x,\lambda)$ points to a better neighborhood direction. One may use either greedy search direction (best neighborhood search direction) or gradient decent direction as the direction for $\Delta_x L(x,\lambda)$.

We then form a discrete Lagrange-based update rule:

$$x^{k+1} = x^k + \Delta_x L(x^k, \lambda^k)$$

$$\lambda^{k+1} = \lambda^k + U(k) \quad (7\text{-}9)$$

U(k) is defined as follows.

$$U_i(k+1) = \begin{cases} \lambda_i(K) & \text{if } g_i(i) \text{ is violated} \\ 0 & \text{otherwise} \end{cases} \quad (7\text{-}10)$$

where: $\lambda_i(K)$ is a non-negative adjustment factor that determines the force driving the search process away from the previous encountered violations. $\lambda_i(K)$ can be set, for example, to be 1.

The slack variable y is determined as follows.

$$y_{i,k}^2 = \begin{cases} -G_i(x_k), & \text{if } G_i(x_k) \leq 0 \\ 0, & \text{otherwise} \end{cases} \quad (7\text{-}11)$$

We next present a discrete Lagrange-based method for finding a local optimal solution of the constrained discrete optimization problem (4-4).

Given: an initial point, say $x_0$, which can be infeasible.

Purpose: find a local optimal solution of the constrained discrete optimization problem (4-4).

Step 1. Starting from a given initial point, say $x_0$, where some constraints may be violated.

Step 2. find a local optimal solution by the following steps:
  (i). Set k=1;
  (ii). Compute U(k) from equation (7-10). If $x_0$ is in a feasible component, use the constrained better neighborhood direction and equation (7-8) to compute $\Delta_x L(x,\lambda)$; otherwise use better neighborhood direction in the original solution space to compute $\Delta_x L(x,\lambda)$.
  (iii). If both U(k) and $\Delta_x L(x,\lambda)$ are sufficiently small, then the search converges and the current point $x_0$ is the local optimal solution; otherwise update x and $\lambda$ and proceed to the next step.
  (iv). Set k=k+1.
  (v) Repeat steps (ii) through (iv) for a predefined number of iterations.

7.3 Hybrid Constrained Local Search Method

A hybrid constrained local search method for obtaining a local optimal solution of the constrained discrete optimization problem (4-5) starting from a feasible initial point is presented below:

Given: a feasible initial point, say $x_0$, lying in a feasible component.

Purpose: find a local optimal solution lying in the feasible component.

Step 1. Starting from a feasible initial point, say $x_0$, apply an effective iterative improvement local search algorithm for solving the constrained optimization problem (4-5) from the initial point.

Step 2. If the local search algorithm converges to a local optimal solution, then stop; otherwise, set the end point as the initial point, namely $x_0$, and proceed to the next step.

Step 3. Use the constrained best neighborhood local search method or the constrained better neighborhood local search method starting from $x_0$ to continue the search process for a few steps to obtain an end point. Set the end point as the initial point and go to step 1.

7.4 Methods for Computing Feasible Exit Point

A method for computing the feasible exit point of a discrete dynamical system (7-3) associating with a constrained discrete optimization problem (4-5) along a search path starting from a know local optimal solution, termed herein the a discrete-based method for computing a feasible exit point (i.e. exit point satisfying all the constraints), is presented below:

Given: a local optimal solution, say $x_s$, and a pre-defined search path.

Purpose: find the corresponding feasible exit point (EP).

Starting from a known local optimal solution, say $x_s$, move along the pre-defined search path to detect said exit point, which is the first local maximum of the objective function (4-5) along the pre-defined search path. Check constraint violations during the process. If a constraint is violated, then stop the search process.

7.5 Methods for Computing Feasible DDP

For the constrained discrete optimization problem (4-5), we develop a dynamical method for computing the feasible dynamical decomposition point (DDP) with respect to a local optimal solution and with respect to a pre-defined search path as follows:

Given: a local optimal solution, say $x_s$, of the optimization problem (4-5), a pre-defined search path, and the associated discrete dynamic system (7-3).

Purpose: find the corresponding feasible dynamical decomposition point (DDP).

Step 1. Starting from a known local optimal solution $x_s$, move along the pre-defined search path to find the corresponding feasible exit point (i.e. exit point that satisfies all the constraints) of the discrete dynamical system (7-3). Let the exit point be denoted as $x_{ex}$.

Step 2. Starting from $x_{ex}$, apply the constrained best neighborhood search method to move $x_{ex}$ one (forward) iteration to a new point, say $x_c$.

Step 3. Perform ray adjustment procedure and DDP computation.
  (i). Form a ray connecting $x_s$ and $x_c$.
  (ii) If vectors $(x_s - x_{ex})$ and $(x_c - x_{ex})$ are available, then perform step (ii)(a); otherwise, perform the alternative.

(a) Compute the angle $\epsilon$ between two vectors ($x_s-x_{ex}$) and ($x_c-x_{ex}$). If $\epsilon$ is close to 0° or 180°, then $x_{ex}$ is the DDP and stop the process; otherwise proceed to step (iii).

(alternative of Step (a)) Update the search path to make the current $x_{ex}$ lie on the updated search path. Check if the three points $x_{ex}$, $x_c$ and $x_s$ lie on the updated search path. If yes, then $x_{ex}$ is the DDP and stop the process; otherwise proceed to the next step.

(iii). Adjust $x_c$ to the point, say $x_c'$, which is the first local maximum point of the objective function of the optimization problem (4-5) along the ray starting from $x_s$. If $x_c'$ is the same point as $x_{ex}$, then $x_c'$ is the DDP and stop the process; otherwise proceed to the next step.

Step 4. Use $x_c'$ as the exit point, i.e. assign $x_c' \to x_{ex}$, and go to step 2.

7.6. EP-based Method for Finding Another Local Optimal Solution

For the constrained discrete optimization problem (4-5), we develop an exit-point-based method for finding a new local optimal solution starting from a known local optimal solution as follows:

Given: a local optimal solution, say $x_s$, of the constrained discrete optimization problem (4-5) and a pre-defined search path.

Purpose: find the corresponding new (tier-one) local optimal solution.

Step 1. Move along the pre-defined search path starting from $x_s$ and apply the discrete-based method to the associated nonlinear dynamic system (7-3) to compute the corresponding feasible exit point (EP), say $x_{ex}$. If a feasible EP cannot be found, then stop the process; otherwise proceed to the next step.

Step 2. Starting from the found exit point $x_{ex}$, move along the pre-defined search path one step farther away from $x_s$ to a new point. Let the new point be denoted as $x_0$ (or use $x_0 = x_s + (1+\epsilon)(x_{ex}-x_s)$, where $\epsilon$ is a small number, if the expression is available).

Step 3. Apply the constrained best neighborhood search method starting from $x_0$ to obtain the corresponding system trajectory until it reaches an interface point, $x_{inf}$, at which an effective (hybrid) local search method for solving the optimization problem (4-5) outperforms the constrained best neighborhood search method.

Step 4. Starting from the interface point $x_{inf}$, apply the effective hybrid local search method, chosen in step 3, to find the corresponding adjacent local optimal solution.

7.7 DDP-based Method for Finding Another Local Optimal Solution

For the constrained discrete optimization problem (4-5), a DDP-based method for finding a local optimal solution starting from a known local optimal solution, say $x_s$, is developed as follows:

Given: a local optimal solution, say $x_s$, of the constrained discrete optimization problem (4-5), and a predefined search path.

Purpose: find the corresponding new (tier-one) local optimal solution.

Step 1. Move along the pre-defined search path starting from $x_s$ and apply a discrete-based method to the associated nonlinear dynamical system (7-3) to compute the corresponding feasible dynamical decomposition point (DDP), say $x_{ddp}$. If a DDP cannot be found, then stop the process; otherwise proceed to the next step.

Step 2. Starting from the found feasible DDP $x_{ddp}$, move along the updated search path used to adjust the last exit point $x_{ex}$ one step farther away from $x_s$ to a point, denoted as $x_0$, (or use $x_0 = x_s + (1+\epsilon)(x_{ddp}-x_s)$, where $\epsilon$ is a small number, if the expression is available).

Step 3. Apply the constrained best neighborhood search method to the associated discrete nonlinear dynamic system (7-3) starting from $x_0$ to obtain the corresponding system trajectory until it reaches an interface point, $x_{inf}$, at which an effective hybrid local search method outperforms the constrained best neighborhood search method.

Step 4. Starting from the interface point $x_{inf}$, apply the effective hybrid local search method, chosen in step 3, to find the corresponding adjacent local optimal solution.

7.8. Method for Finding all the Tier-one Local Optimal Solutions Inside a Feasible Component We develop in the following one dynamical discrete-based method for finding all the tier-one local optimal solutions, lying within a feasible component, of the constrained discrete optimization problem starting from a known local optimal solution.

Given: a local optimal solution, say $x_s$, of the constrained discrete optimization problem (4-3).

Purpose: find all tier-one local optimal solutions of $x_s$ lying within a feasible component.

Step 1. Initialize the set of tier-one local optimal solutions $V_s = \{x_s^0\}$ and define a set of search paths $S_i$ for $x_s^0$ $i=1,2,\ldots,m$. Set $i=1$.

Step 2. For each search path $S_i$ starting from $x_s^0$, apply a discrete-based EP-based (or DDP-based method) method to the associated dynamical system (7-3) to find another local optimal solution. If a local optimal solution is found, then let it be denoted as $x_s^i$ and proceed to the next step; otherwise, go to step 4.

Step 3. Check if $x_s^i$ has been found before, i.e. $x_s^i \in V_s$. If not found, set $V_s = V_s \cup \{x_s^i\}$.

Step 4. Set $i=i+1$.

Step 5. Repeat steps 2 through 4 until $i>m$.

7.9. Method for Finding all the Local Optimal Solutions within a Feasible Component We develop in the following a discrete-based dynamical method for finding all the local optimal solutions lying within a feasible component of the constrained discrete optimization problem (4-5), starting from a given initial point.

Given: a local optimal solution, say $x_s$, of the constrained discrete optimization problem (4-3).

Purpose: find all local optimal solutions lying within a feasible component containing $x_s$.

Step 1. Starting from $x_0$, apply an effective (hybrid) search method to find a local optimal solution, say $x_s^0$.

Step 2. Set $j=0$. Initialize the set of local optimal solutions $V_s = \{x_s^0\}$, the set of tier-j local optimal solutions $$V_{new}^j = \{x_s^0\}.$$

Step 3. Initialize the set of tier-(j+1) local optimal solutions $$V_{new}^{j+1} = \{\phi\}.$$

Step 4. For each local optimal solution in $$V_{new}^j,$$

say, $x_s^J$, find its all tier-one local optimal solutions.
  (i). Define a set of search paths $S_i^J$ for $x_s^J$, i=1,2, ..., $m_j$. Set i=1.
  (ii). For each search path $S_i^J$ starting from $x_s^J$, apply the EP-based method (or DDP based method) to the associated discrete nonlinear dynamic system (7-3) to find another local optimal solution. If a local optimal solution is found, then let it be denoted as $$x_{s,j}^i$$

and proceed to the next step; otherwise, go to the step (iv).
  (iii). Check if $$x_{s,j}^i$$

has been found before, i.e.

$$x_{s,j}^i \in V_s.$$

If not found, set $$V_s = V_s \cup \{x_{s,j}^i\} \text{ and } V_{new}^{j+1} = V_{new}^{j+1} \cup \{x_{s,j}^i\}$$

(iv). Set i=+1.
  (v) Repeat steps (ii) through (iv) until i>$m_j$.
Step 5. If the set of all newly computed local optimal solutions, $$V_{new}^{j+1},$$

is empty, continue with step (6); otherwise set j=j+1 and go to step (3).
  Step 6. Output the set of local optimal solutions $V_s$ and identify the global optimal solution by comparing their corresponding objective function values in set $V_s$ and select the one with the smallest value. And output it as the found global optimal solution, and output the set of all the local optimal solutions, $V_s$, lying within a feasible component.

7.10. Method for Finding an Adjacent Feasible Component

We develop in the following a dynamical method for finding an adjacent isolated feasible components starting from a known feasible component for the
  Given: a feasible initial point, say $x_0$.
  Purpose: find a new feasible point located in an adjacent feasible component of the constrained discrete optimization problem (4-5).
  Step 1. Starting from $x_0 + \epsilon \times S_i$, $\epsilon$ is a small number, integrate system (7-4) reverse-time to obtain a trajectory (in reverse-time mode), and switch to a local search method if necessary, which will find a point lying in an unstable equilibrium manifold of (7-4). If a point is found, let it be denoted as $x_d^i$ and proceed to the next step; otherwise stop the process.
  Step 2. Set $x_p^i = x_d^i + (1+\epsilon)(x_d^i - x_0)$, where $\epsilon$ is a small number
  Step 3. Starting from $x_p^i$, integrate system (7-4) in forward time to obtain a trajectory or apply an effective hybrid local search method, to find a feasible point located in an isolated feasible component. Let it be denoted as $x_0^i$.

7.11. Method for Finding all the Local Optimal Solutions

We develop in the following dynamical discrete-based methods for finding all the local optimal solutions of the constrained discrete optimization problem (4-5), starting from a given initial point. If all the local optimal solutions have been found, then the global optimal solution is, thus, obtained; otherwise, the best solution among all the found local optimal solutions is obtained.
  Given: an initial point, say $x_0$.
  Purpose: (i) find all local optimal solutions of the constrained discrete optimization problem (4-5).
    (ii) find the global optimal solution of the constrained discrete optimization problem (4-5).
  Step 1. Starting from $x_0$, apply an effective local search method to locate a local optimal solution, say $x_0^0$.
  Step 2. Set j=0. And initialize the set of local optimal solutions $V_s = \{x_s^0\}$, the set of tier-0 feasible components $V_0^j = \{x_s^0\}$.
  Step 3. Initialize the set of tier-(j+1) feasible components $$V_0^{j+1} = \{\phi\}.$$

Step 4. for each feasible point in $V_0^j$, say, $x_0^j$, find local optimal solutions lying within the feasible component containing $x_0^j$, and all adjacent feasible components using the following steps:
    (i). Starting from $x_0^j$, apply a dynamical method to find all the local optimal solutions lying within the feasible component of the optimization problem (4-5) containing $x_0^j$;
    (ii). Define a set of search paths $S_i^J$ for $x_0^j$, i=1,2, ..., k;
    (iii). for each search path $S_i^J$, finding an adjacent feasible component by performing the following steps:
      (a). set i=1;
      (b). Apply a method for finding an adjacent feasible component to find a point, say $x_{0,i}^j$, located in an adjacent feasible component;
(c). starting from $x_{0,i}^j$, apply an effective (hybrid) local search method to find a local optimal solution, say $x_{s,i}^j$.

Check if $x_{s,i}^j$ has been found before, i.e.

$x_{s,i}^j \in V_s$.

If not found, set $V_0^{j+1} = V_0^{j+1} \cup \{x_{0,i}^j\}$ and $V_s = V_s \cup \{x_{s,i}^j\}$;

(d) Set i=i+1.
(e) Repeat steps (b) through (d) until i>k,

Step 5. If the set of all newly computed feasible points, $V_0^{j+1}$, is empty, continue with step (6); otherwise set j=j+1 and go to step (3).

Step 6. Output the set of local optimal solutions $V_s$ and identify the global optimal solution by comparing their corresponding objective function values in set $V_s$ and select the one with the smallest value. And output it as the found global optimal solution.

8. An Example: VLSI Partition Problems

A VLSI system is partitioned at several levels due to its complexity: (1) system level partitioning, in which a system is partitioned into a set of sub-systems whereby each sub-system can be designed and fabricated independently on a single PCB; (2) board level partitioning while the a PCB is partitioned into VLSI chips; (3) chip level partitioning where a chip is divided into smaller sub-circuits. At each level, the constraints and objectives of the partitioning are different. The report will concentrate on the chip level partitioning. The results can be expended to other partitioning level with some effort.

The partitioning problem can be expressed more naturally in graph theoretic terms. A hypergraph G=(V, E) representing a partitioning problem can be constructed as follows. Let $V=\{v_1,v_2,\ldots,v_n\}$ be a set of vertices and $E=\{e_1,e_2,\ldots,e_m\}$ be a set of hyperedges. Each vertex represents a component. There is a hyperedge joining the vertices whenever the components corresponding to these vertices are to be connected. Thus, each hyperedge is a subset of the vertex set i.e., $e_i \subseteq V, i=1,2,\ldots,m$. In other words, each net is represented by a set of hyperedges. The area of each component is denoted as $a(v_i), 1 \leq i \leq n$. The partitioning problem is to partition V into $V_1, V_2, \ldots, V_k$n where $V_i \cap V_j = \phi$, $i \neq j$ $\cup_{i=1}^k V_i = V$ Partition is also referred to as a cut. The cost of partition is called the cut-size, which is the number of hyperedges crossing the cut. Let $C_{ij}$ be the cut-size between partitions $V_i$ and $V_j$. Each partition $V_i$ has an area $$\text{Area}(V_i) = \sum_{v \in V_i} a(v)$$

and a terminal count Count(Vi). The maximum and the minimum areas, that a partition $V_i$ can occupy, are denoted as $A_i^{\max}$ and $A_i^{\min}$ respectively. The maximum number of terminals that a partition $V_i$ can have is denoted as Ti. Let $P=\{p_1,p_2,\ldots,p_m\}$ be a set of hyperpaths. Let $H(p_i)$ be the number of times a hyperpath $p_i$ is cut.

The constraints and the objective functions for the problem at chip level partitioning are described as follows.

Objective 1 is to minimize the interconnections between partitions. Reducing the interconnections not only reduces the delay but also reduces the interface between the partitions making it easier for independent design and fabrication. A large number of interconnections increase the design area as well as complicating the task of the placement and routing algorithms. The objective of minimizing the interconnections can be stated as:

$$\min \sum_{i=1}^k \sum_{j=1}^k c_{ij}, (i \neq j) \qquad (8\text{-}1)$$

Objective 2 is to minimize the delay due to partitioning. The partitioning of a circuit might cause a critical path to go in between partitions a number of times, which increases the delay in that path significantly. In order to address this issue, an objective function is given as:

$$\min_{p_i \in P} \max (H(p_i)) \quad (8\text{-}2)$$

Constraint 1 is to maintain the number of terminals so as not to exceed a preset threshold Ti. This constraint can be stated as:

$$\text{Count}(V_i) < T_i \quad (8\text{-}3)$$

Constraint 2 is to keep the area of each partition within a present limit. At chip partitioning level, this constraint is to maintain the size of each partition such that all partitions are relatively comparable. Otherwise, for example, a two-way partitioning problem may end up with a result that one partition is empty and the other partition contains all the components of the problem. This constraint is not as important as in the other levels of partitioning where a physical bound is set. The constraint for area limit is stated as:

$$A_i^{\min} \le \text{Area}(V_i) \le A_i^{\max} \quad (8\text{-}4)$$

The partition problem belongs to the category where no closed-form objective function is available. And it appears that no distance can be defined to fill the continuous space between two instances of partitions. So only the discrete version of the solution algorithm can be developed.

We have applied the embodiment of our invention in section 6 to develop a discrete-based DDP-based method to solve the partition problem. As to the hybrid local search, the industry standard FM method is used. We have implemented the developed methods and evaluated it on several benchmark problems. The test results shown in the table 4 are obtained using the minimum cutsets of 50 runs from different initial points under 45–55% area balance criterion and real cell sized. The simulation results using the standard FM method are also shown as a comparison.

TABLE 4

Partition results on benchmark problems

| Benchmark Circuits | Number of cells | Number of Cutsets obtained from the FM Method | DDP Method Number of Cutsets | Improvement |
|---|---|---|---|---|
| S1423 | 831 | 17 | 15 | 13% |
| S38584 | 22451 | 199 | 54 | 268% |
| S38417 | 25589 | 405 | 120 | 238% |
| S13207 | 9445 | 91 | 78 | 17% |
| S15850 | 11071 | 144 | 79 | 82% |
| S35932 | 19880 | 120 | 100 | 20% |
| C7552 | 2247 | 23 | 21 | 9.5% |
| S9234 | 6098 | 56 | 51 | 9.8% |
| S5378 | 3225 | 98 | 76 | 29% |

By incorporating the DDP-based method with the traditional FM method, the quality of the solution is significantly improved, which is shown in table 4. The improvements range from 9.5% to 268%, where large circuits achieve a big improvement and small circuits achieve a small improvement. Overall, the DDP-based method is significantly better than the FM method. In some cases, the DDP-based method outperforms the results of current leading-edge multi-level partitioning approach. Our recent work shows that, by incorporating the multi-level partition approach as the hybrid local search method, the DDP-based method is also able to achieve a significant improvement over the results of the multi-level partition approach.

The other improvement of the DDP-based method is that the solution deviation is significantly smaller compared to the same indices of the FM method. This improvement means that the DDP-based method needs much fewer runs than the FM method to get a good solution.

References:
1. "Local Search in Combinatorial optimization" Edited by E. Aarts and J. K. Lenstra, Wiley, 1997.
2. H. D. Chiang and L. Fekih-Ahmed, "Quasistablity Regions of Nonlinear Dynamical Systems: Theory", IEEE Trans. on Circuits and Systems: I Fundamental Theory and Applications, Vol CAS-43, August 1996, pp. 627–635.
3. Hsiao-Dong Chiang and Chia-Chi Chu, "A Systematic Search Method for Obtaining Multiple Local Optimal Solutions of Nonlinear Programming Problems", IEEE Trans. on Circuits and Systems: I Fundamental Theory and Applications, Vol. 43, No.2, February 1996, pp. 99–109.
4. H. D. Chiang, M Hirsch and F. F. Wu, "Stability Regions of Nonlinear Autonomous Dynamical Systems", IEEE Trans. On Automatic Control Vol. AC-33, January 1988, pp. 16–27.

What is claimed is:

1. A continuous-based dynamical method for solving general unconstrained optimization problems having objective functions and a solution space of finite dimension, comprising the steps of:
   a) constructing a nonlinear continuous dynamical system possessing selected properties at least including the property that a point is a stable equilibrium point of the constructed nonlinear dynamical system if and only if it is a local optimal solution of the unconstrained optimization problem;
   b) finding all local optimal solutions of the general unconstrained optimization problem by the steps of:
      i) starting from an initial point;
      ii) finding a local optimal solution;
      iii) starting at the local optimal solution found in step (b)(ii), finding a set of local optimal solutions which are all stable equilibrium points of the constructed nonlinear dynamical system tier-by-tier by a method selected from the group comprising the exit point (EP) method and the dynamical decomposition point (DDP) method;
   c) choosing a global optimal solution as a best optimal solution from among the stable equilibrium points found in step (b)(iii).

2. The method of claim 1, in which the general unconstrained optimization problem is of the form Minimize UC(x), where an objective function UC: $R^n \to R$ is selected from a group comprising a closed-form expression and a black-box expression, and the function UC(x) is bounded below so that a global optimal solution exists and a number of local optimal solutions is finite.

3. The method of claim 1, in which the general unconstrained optimization problem is of the form Minimize UC(x), where an objective function UC: $S \to R$, where S is a discrete solution space, and the objective function is selected from a group comprising a closed-form expression and a black-box expression, and the function UC(x) is bounded below so that a global optimal solution exists and a number of local optimal solutions is finite.

4. The method of claim 1, in which the constructed nonlinear dynamical system in step (a) is of the form $\dot{x}=F^U(x)$ where $x \in R^n$ and n is the dimension of the solution space of the optimization problem, and the constructed dynamical system satisfies all of the following properties:
  a) the vector field f(x) satisfies the existence and uniqueness of solutions;
  b) every trajectory of the constructed nonlinear dynamical system converges, and converges to one of its equilibrium points; and
  c) the objective function of the optimization problem decreases along every trajectory of the constructed nonlinear dynamical system.

5. The method of claim 4, in which the continuous optimization problem has a closed-form objective function UC(x) and the nonlinear dynamical system constructed in step (a) is a dynamical system $\dot{x}=-\nabla UC(x)$ where $\nabla(UC): R^n \to R^n$ is a gradient vector of the objective function UC(x).

6. The method of claim 4, in which the continuous optimization problem has a black-box objective function UC(x) and the nonlinear dynamical system constructed in step
  (a) is a dynamical system $$\dot{x}_i = -\frac{UC(x + h \times e_i) - UC(x)}{h}, i = 1, 2, \ldots, n,$$

where a derivative of UC(x) with respect to an ith component of x is approximated by one-sided differences, $e_i$ is an i-th Cartesian basis vector and h is a sufficiently small scalar.

7. The method of claim 4, in which the continuous optimization problem has a black-box objective function UC(x) and the nonlinear dynamical system constructed in step
  (a) is a dynamical system $$\dot{x}_i = -\frac{UC(x + h \times e_i) - UC(x - h \times e_i)}{2h}, i = 1, 2, \ldots, n,$$

where a derivative of UC(x) with respect to an i-th component of x is approximated by central differences, $e_i$ is an i-th Cartesian basis vector and h is a sufficiently small scalar.

8. The method of claim 3, in which the optimization problem is discrete, the method further comprises the step, before step (a), of transforming the optimization problem into a continuous optimization problem.

9. The method of claim 8, wherein the transformation satisfies the following properties:
  a) the global optimal solution of the discrete optimization problem and the global optimal solution of the transformed continuous optimization problem are close;
  b) the set of local optimal solutions of the discrete optimization problem is close to the set of local optimal solutions of the transformed continuous optimization problem.

10. The method of claim 8, in which the transformation performed in the transformation step is transformation by appending a modulator, $$UC_{eq}(x) = UC(x) + \mu \prod_{i=1}^{n} \sin^2(\pi x_i) \quad x \in R^n,$$

where a coefficient $$\mu > \frac{L}{2}$$

and L is a Lipschitz constant of the original objective function UC(x).

11. The method of claim 8, in which the transformation performed in the transformation step is a piecewise linear translation $$C_{eq}(x) = \begin{cases} C(x) & \text{when } \lfloor x \rfloor = \lceil x \rceil \\ C\left(\lfloor x \rfloor + \frac{C(\lceil x \rceil) - C(\lfloor x \rfloor)}{dist(\lceil x \rceil - \lfloor x \rfloor)} dist(x - \lfloor x \rfloor)\right) & \text{when } \lfloor x \rfloor \neq \lceil x \rceil \end{cases}$$

where dist(x, y) is a distance between x and y, $x=(x_1, x_2 \ldots, x_n) \in R^n$, $$\lceil x \rceil = (\lceil x_1 \rceil, \lceil x_2 \rceil, \cdots, \lceil x_n \rceil) \text{ and } \lceil x_i \rceil$$

denotes a smallest integer that is greater than or equal to $$x_i, \lfloor x \rfloor = (\lfloor x_1 \rfloor, \lfloor x_2 \rfloor, \cdots, \lfloor x_n \rfloor) \text{ and } \lfloor x_i \rfloor$$

denote largest integers that are smaller than or equal to $x_i$.

12. The method of claim 2, in which the optimization problem is continuous, the step (b)(ii) of claim 1 of finding a local optimal solution is a hybrid local search method comprising the steps of:
  a) applying an local search algorithm to the optimization problem, starting from an initial point $x_0$;
  b) if the local search algorithm converges to a local optimal solution, then stopping; otherwise, proceeding to the next step;
  c) integrating the constructed nonlinear dynamical system starting from the initial point $x_0$ for a few time-steps to get an end point;
  d) setting the end point as the initial point; and
  e) going to step (a).

13. The method of claim 12, in which the local search algorithm of the step (a) is a preexisting local search algorithm.

14. The method of claim 3, in which the optimization problem is discrete, and the step (b)(ii) of claim 1 of finding a local optimal solution is a hybrid local search method comprising the steps of:
  a) applying an local search algorithm to the optimization problem, starting from an initial point $x_0$;
  b) if the local search algorithm converges to a local optimal solution $x_s$, then going to step (e); otherwise, proceeding to the next step;

c) integrating the constructed nonlinear dynamical system starting from the initial point $x_0$ for a few time-steps to get an end point; setting the end point as the initial point;
d) going to step (a);
e) rounding off the local optimal solution $x_s$, to a plurality of m closest discrete points by a step selected from a group comprising selecting a point having a minimum value as the local optimal solution and stopping; and using the plurality of closest discrete points as initial points for step (f);
f) applying a best neighborhood local search method to each initial point respectively to obtain m local optimal solutions $x_{s1}, \ldots, x_{sm}$; and
g) selecting a point having a minimum value as the local optimal solution of the optimization problem.

15. The method of claim 14, in which the local search algorithm of the step (a) is a preexisting local search algorithm.

16. The method of claim 1, in which the step (b)(iii) of computing all local optimal solutions by an exit point-based method comprising the steps of;
a) starting from an known local optimal solution $x_s^0$;
b) setting j=0 and initializing a set of local optimal solutions $V_s=\{x_s^0\}$, a set of tier-j local optimal solutions $$V_{new}^j = \{x_s^0\};$$

c) initializing a set of tier-(j+1) local optimal solutions $$V_{new}^{j+1} = \{\phi\};$$

d) for each local optimal solution in $$V_{new}^j, x_s^j,$$

finding all new tier-one local optimal solutions, and recording the new tier-one local optimal solutions in the set $$V_s \text{ and } V_{new}^{j+1};$$

e) if the set of all newly computed local optimal solutions, $$V_{new}^{j+1},$$

is not empty, setting j=j+1; and going to step (c);
such that $V_s$ comprises the set of local optimal solutions of $x_s^0$.

17. The method of claim 16, in which the step (d) of finding the set of tier-one local optimal solutions of a given local optimal solution by an exit point method, comprising the steps of:
a) starting from a known local optimal solution $x_s^0$, the set of found local optimal solutions $V_s$, and a given set of local optimal solutions $$V_{new}^{j+1};$$

b) defining a set of search paths $S_i$ for $x_s^0$, i=1,2,…, m;
c) setting i=1; and
d) for each search path $S_i$, computing a corresponding local optimal solution by the steps of:
  i) finding another local optimal solution; if a local optimal solution is found, letting the local optimal solution be denoted as $x_s^i$ and proceeding to step (ii); otherwise proceeding to step (iii);
  ii) checking if $x_s^i \in V_s$ indicating that $x_s^i$ has been found before; if $x_s^i$ has not been found before, setting $V_s = V_s \cup \{x_s^i\}$ and $$V_{new}^{j+1} = V_{new}^{j+1} \cup \{x_s^i\};$$

iii) setting i=i+1; and
  iv) repeating step (i) through step (iii) until i>m;
such that $V_s$ comprises the set of local optimal solutions of $x_s^0$.

18. The method of claim 17, in which the step (d)(i) of finding another local optimal solution by an exit-point-based method comprises the steps of:
a) starting from the known local optimal solution $x_s$ and a pre-defined search path;
b) computing an exit point (EP) with respect to the pre-defined search path and to the stable equilibrium point $x_s$ of the constructed nonlinear dynamical system, denoted as $x_{ex}$;
c) setting $x_0 = x_s + (1+\epsilon)(x_{ex} - x_s)$ where $\epsilon$ is a small number;
d) starting from $x_0$, conducting a transitional search via a system trajectory until reaching an interface point $x_{inf}$ at which a local search method outperforms the transitional search;
e) starting from the interface point $x_{inf}$, applying the local search method, chosen in step (d), to find an adjacent local optimal solution.

19. The method of claim 18, in which the local search method of the step (d) is a preexisting local search algorithm.

20. The method of claim 18, in which the step (b) of computing an exit point with respect to a search path comprises the steps of:
i) starting from a known local optimal solution $x_s$; and
ii) moving along the pre-defined search path to compute the exit point, which is the first local maximum of the objective function of the optimization problem along the pre-defined search path.

21. The method of claim 18, in which the step (b) of finding the exit point with respect to a given search path comprises the steps of:
i) starting from a known local optimal solution $x_s$;
ii) moving along the given search path, at each time-step, computing the inner-product of the derivative of the search path and the vector field of the constructed nonlinear dynamical system;
iii) when the sign of an inner-product changes from positive to negative, between the interval $[t_1, t_2]$, then using to approximate the exit point, a point selected from the group comprising the point which is the search path at time $t_1$, and the point which is the search path at time $t_2$.

22. The method of claim 18, in which the step (d) of conducting the transitional search comprises integrating the constructed nonlinear dynamical system.

23. The method of claim 18, in which the optimization problem is discrete and step (d) of conducting the transitional search comprises rounding off $x_0$ in a direction away from $x_s$, but close to a direction $(x_{ep}-x_s)$, to a new point $x_0'$; then starting from $x_0'$, applying a best neighborhood search method.

24. The method of claim 1, in which the step (b)(iii) of computing all local optimal solutions by a DDP-based method comprises the steps of:
   a) starting from a known local optimal solution $x_s^0$;
   b) setting j=0 and initializing a set of local optimal solutions $V_s=\{x_s^0\}$, a set of tier-j local optimal solutions $$V_{new}^j = \{x_s^0\},$$

and a set of found dynamical decomposition points $V_{ddp}=\{\phi\}$;
   c) initializing a set of tier-(J+1) local optimal solutions $$V_{new}^{j+1} = \{\phi\};$$

d) for each local optimal solution in $$V_{new}^j, x_s^j,$$

finding all new tier-one local optimal solutions and recording the new tier-one local optimal solutions in $V_s$ and $$V_{new}^{j+1};$$

e) if the set of all newly computed local optimal solutions, $$V_{new}^{j+1},$$

is not empty, setting j=j+1; and going to step (c);
      such that $V_s$ comprises the set of local optimal solutions of $x_s^0$.

25. The method of claim 24, in which the step (d) of finding the set of tier-one local optimal solutions of a known local optimal solution $x_s^0$, comprises the steps of:
   a) starting from a known local optimal solution $x_s^0$, the set of found local optimal solutions $V_s$, the set of found dynamical decomposition points (DDPs) $V_{ddp}$, and a given set of local optimal solutions $$V_{new}^{j+1};$$

b) defining a set of search paths $S_i$ for $x_s^0$, i=1,2, . . . , $m_j$, and setting i=1;
   c) for each search path $S_i$, computing its corresponding local optimal solution by the steps of:
      i) finding the corresponding DDP; if a DDP is found, proceeding to the next step; otherwise, going to step (vii);
      ii) letting the found DDP be denoted as $x_{ddp,i}$, checking if it belongs to the set $V_{ddp}$, i.e, $x_{ddp,i} \in V_{ddp}$; if it does, going to step (vii); otherwise setting $V_{ddp}=V_{ddp} \cup \{x_{ddp,i}\}$ and proceeding to the next step;
      iii) setting $x_{0,i}=x_s^0+(1+\epsilon)(x_{ddp,i}-x_s^0)$, where $\epsilon$ is a small number;
      iv) starting from $x_{0,i}$, conducting a transitional search to obtain an interface point $x_{inf,i}$ at which a local search method outperforms the transitional search;
      v) starting from the interface point $x_{inf,i}$, applying the hybrid local search method, chosen in step (iv), to find the corresponding local optimal solution with respect to $x_{ddp,i}$, denoted as $x_s^i$;
      vi) checking if $$x_{s,j}^i$$

has been found before, i.e, $$x_{s,j}^i \in V_s;$$

if not found, setting $$V_s = V_s \cup \{x_s^i\}, V_{new}^{j+1} = V_{new}^{j+1} \cup \{x_s^i\};$$

vii) setting i=i+1; and
      viii) repeating step (i) through step (vii) until i>$m_j$;
      such that $V_s$ comprises the set of local optimal solutions of $x_s^0$.

26. The method of claim 25, in which step (c)(iv) of conducting the transitional search comprises integrating the constructed nonlinear dynamical system.

27. The method of claim 25, in which the optimization problem is discrete and step (c)(iv) of conducting the transitional search comprises rounding off $x_0$ in a direction away from $x_s$, but close to a direction $(x_{ep}-x_s)$, to a new point $x_0'$; then starting from $x_0'$, applying a best neighborhood search method.

28. The method of claim 25, in which the local search method of the step (c)(iv) is a preexisting local search algorithm.

29. The method of claim 25, in which the step (c)(i) of finding a dynamical decomposition point (DDP) with respect to a given search path and with respect to the stable equilibrium point $x_s$ comprises the steps of:
   a) starting from a known local optimal solution $x_s$ and a pre-defined search path;
   b) computing the exit point; letting the exit point be denoted as $x_{ex}$;
   c) starting from $x_{ex}$, computing the minimal distance point (MDP) by the steps of:
      i) integrating the constructed nonlinear dynamical system $\dot{x}=F^U(x)$ for a few time-steps; letting the end point be denoted as the current exit point;
      ii) drawing a ray connecting the current exit point and the local optimal solutions $x_s$, and replacing the current exit point with a corrected exit point which is the first local maximal point of objective function along said ray starting from $x_s$;

iii) repeating steps (i) through (ii) until a norm of the vector field $F^u(x)$ at the exit point obtained in step (ii) is smaller than a threshold value;

iv) declaring the current exit point as a minimal distance point (MDP) $x_d^0$; and d) using the MDP $x_d^0$ as an initial guess and solving a set of nonlinear algebraic equations of the vector field $F^U(x)=0$, wherein a solution is the DDP, denoted by $x_{ddp}$, with respect to the stable equilibrium point $x_s$ and to the search path.

30. A discrete-based dynamical method for solving general discrete optimization problems having objective functions and a solution space of finite dimension, comprising the steps of:

a) constructing a discrete nonlinear dynamical system possessing selected properties at least including the property that a point is a local optimal solution of the discrete optimization problem if and only if it is a stable fixed point of the discrete nonlinear dynamical system;

b) finding all local optimal solutions of the general discrete optimization problem by the steps of:
  i) starting from an initial point $x_0$;
  ii) finding a local optimal solution;
  iii) starting at the local optimal solution found in step (b)(ii), finding the set of local optimal solutions which are all stable fixed points of the constructed discrete nonlinear dynamical system;

c) choosing the global optimal solution as the best optimal solution from among the stable fixed points found in step (b)(iii).

31. The method of claim 30, in which the general discrete optimization problem is of the form Minimize UC(x), where an objective function UC: S→R , where S is a discrete solution space, and the objective function is selected from a group comprising a closed-form expression and a black-box expression, and the function UC(x) is bounded below so that a global optimal solution exists and a number of local optimal solutions is finite.

32. The method of claim 30, in which the general discrete optimization problem is of the form Minimize C(x), subject to G(x)≦0, where an objective function C: S→R is selected from a group comprising closed-form expressions and black-box expressions, and the function C(x) is a bounded below function over a feasible region so that a global minimal solution exists, the number of local minimal solutions is finite, and a constraint function vector G: S→$R^m$ has closed-form expression.

33. The method of claim 30, in which the constructed discrete nonlinear dynamical system in step (a) is of the form $x_{k+1}=f(x_k)$, where x∈S, S is the solution space of the optimization problem, and the constructed discrete nonlinear dynamical system satisfies all of the following properties:

a) every trajectory of the constructed discrete nonlinear dynamical system converges, and converges to one of its fixed points; and b) the objective function of the discrete optimization problem decreases along every trajectory of the constructed discrete nonlinear dynamical system.

34. The method of claim 30, in which the discrete optimization problem is unconstrained, and the step (a)(ii) of finding a local optimal solution is a hybrid local search method comprising the steps of:

a) applying an iterative improvement local search algorithm to the discrete optimization problem, starting from the initial point $x_0$;

b) if the local search algorithm converges to a local optimal solution, then stopping; otherwise, proceeding to the next step;

c) using a best neighborhood search method starting from the initial point $x_0$ for a few time-steps to get an end point;

d) setting the end point as the initial point; and going to step (a).

35. The method of claim 34, in which the iterative improvement local search algorithm of the step (a) is a preexisting local search algorithm.

36. The method of claim 30, in which the optimization problem is unconstrained, the step (b)(iii) of computing all local optimal solutions comprises the steps of:

a) starting from a known local optimal solution $x_s^0$;

b) setting j=0 and initializing a set of local optimal solutions $V_s=\{x_s^0\}$, a set of tier-j local optimal solutions $$V_{new}^j = \{x_s^0\};$$

c) initializing a set of tier-(j+1) local optimal solutions $$V_{new}^{j+1} = \{\phi\};$$

d) for each local optimal solution in $$V_{new}^j, x_s^j,$$

finding and recording all new tier-one local optimal solutions in the set $V_s$ and $$V_{new}^{j+1};$$

e) if the set of all newly computed local optimal solutions, $$V_{new}^{j+1},$$

is not empty, setting j=j+1 and going to step (c);

such that $V_s$ comprises the set of local optimal solutions of $x_s^0$.

37. The method of claim 36, in which the step (d) of finding the set of tier-one local optimal solutions comprises the steps of:

a) starting from a known local optimal solution $x_s^0$, the set of found local optimal solutions $V_s$ and a given set of local optimal solutions $$V_{new}^{j+1},$$

defining a set of search paths $S_i$ for $x_s^0$, i=1,2, . . . , m; setting i=1;

b) for each search path $S_i$, finding another local optimal solution by a method selected from the group comprising of the exit point (EP) method and the dynamical decomposition point (DDP) method; if a local optimal solution is found, then letting it be denoted as $x_s^i$ and proceeding to the next step; otherwise, going to step (d);

c) checking if $x_s^i$ has been found before, i.e, $x_s^i \in V_s$; if not found, setting $$V_s = V_s \cup \{x_s^i\} \text{ and } V_{new}^{j+1} = V_{new}^{j+1} \cup \{x_s^i\};$$

d) setting i=i+1; and
e) repeating step (b) through step (d) until i>m;
such that $V_s$ comprises the set of local optimal solutions of $x_s^0$.

38. The method of claim 37, in which the step (b) of finding another local optimal solution by an exit-point-based method comprises the steps of:
a) starting from a known local optimal solution $x_s$ and a pre-defined search path;
b) computing a corresponding exit point (EP) $x_{ex}$;
c) if an EP cannot be found, then stopping; otherwise proceeding to the next step;
d) starting from the found exit point $x_{ex}$, proceeding by a step selected from the group comprising (i) moving along the pre-defined search path one step farther away from $x_s$ to a new point $x_0$, and (ii) using $x_0 = x_s + (1+\epsilon)(x_{ex} - x_s)$, where $\epsilon$ is a small number, if the expression is available;
e) applying a best neighborhood search method starting from $x_0$ until it reaches an interface point, $x_{inf}$, at which a local search method outperforms the best neighborhood search method;
f) starting from the interface point $x_{inf}$, applying the hybrid local search method, chosen in step (e), to find the corresponding adjacent local optimal solution.

39. The method of claim 38, in which the local search method of the step (e) is a preexisting local search algorithm.

40. The method of claim 38, in which the step (b) of finding the exit point with respect to a given search path comprises steps of:
i) starting from a known local optimal solution $x_s$; and
ii) moving along the pre-defined search path to compute the exit point, which is the first local maximum point of the objective function of the optimization problem along the pre-defined search path.

41. The method of claim 37, in which the step (b) of finding another local optimal solution by a DDP-based method comprises the steps of:
a) starting from a known local optimal solution $x_s$ and a pre-defined search path;
b) computing a corresponding dynamical decomposition point (DDP), $x_{ddp}$;
c) if a DDP cannot be found, then stopping; otherwise proceeding to step (d);
d) starting from the found DDP $x_d$, $x_{ep}$, proceeding by a step selected from the group comprising (i) moving one step along the updated search path used to adjust the last exit point $x_{ex}$ farther away from $x_s$ to a new point, denoted as $x_0$, and (ii) using $x_0 = x_s + (1+\epsilon)(x_{ddp} - x_s)$, where $\epsilon$ is a small number, if the expression is available;
e) applying a best neighborhood search method starting from $x_0$ until reaching an interface point, $x_{inf}$, at which a local search method outperforms the best neighborhood search method;
f) starting from the interface point $x_{inf}$, applying the local search method, chosen in step (e), to find a corresponding adjacent local optimal solution.

42. The method of claim 41, in which the local search method of the step (e) is a preexisting local search algorithm.

43. The method of claim 41, in which the step (b) of finding a dynamical decomposition point (DDP) with respect to a given search path comprises the steps of:
a) starting from a known local optimal solution $x_s$, and moving along the pre-defined search path;
b) computing the corresponding exit point (EP) $x_{ex}$;
c) if an EP cannot be found, then stopping;
d) starting from $x_{ex}$, applying a best neighborhood search method to move $x_{ex}$ one (forward) iteration to a new point $x_c$;
e) performing a ray adjustment procedure by the steps of
 i) forming a ray connecting $x_s$ and $x_c$;
 ii) if vectors $(x_s - x_{ex})$ and $(x_c - x_{ex})$ are available, then compute an angle $\epsilon$ between two vectors $(x_s - x_{ex})$ and $(x_c - x_{ex})$; if $\epsilon$ is close to 0° or 180°, then $x_{ex}$ is the DDP, stop; otherwise proceed to step (e)(iv);
 iii) if vectors $(x_s - x_{ex})$ and $(x_c - x_{ex})$ are not available, then update the search path to make the current $x_{ex}$ lie on the updated search path: if points $x_{ex}$, $x_c$ and $x_s$ lie on the updated search path, then $x_{ex}$ is the DDP and stop;
 iv) adjusting $x_c$ to a point $x_c'$, which is a first local maximum point of the objective function along the ray starting from $x_s$;
 v) if $x_c'$ is the same point as $x_{ex}$, then stopping and outputting $x_c'$ as the DDP; otherwise proceeding to step (f);
f) using $x_c'$ as the exit point, i.e, assigning $x_c' \rightarrow x_{ex}$, and going to step (d).

44. The method of claim 32, in which the discrete optimization problem is constrained, having a set of closed-form constraint equations, and the method further comprises the step, before step (a), of constructing a continuous nonlinear dynamical system, for finding the set of all feasible components, to satisfy the following conditions:
a) every system trajectory of the continuous nonlinear dynamical system converges to one of its equilibrium manifolds; and
b) a set is a feasible component of the set of constraint equations if and only if the set is a stable equilibrium manifold of the continuous nonlinear dynamical system.

45. The method of claim 32, in which the discrete optimization problem is constrained, having a set of closed-form constraint equations, and the step (b)(ii) of claim 19 of finding a local optimal solution comprises the steps of:
a) starting from an initial point $x_0$, where some constraints may be violated;
b) finding a local optimal solution by the steps of:
 i) setting k=1;
 ii) computing U(k) from equations $$U_i(k) = \begin{cases} \lambda_i(k-1) & \text{if } g_i(x_{k-1}) \text{ is violated} \\ 0 & \text{otherwise,} \end{cases}$$

where: $\lambda_i(k-1)$ is a non-negative adjustment factor that determines the force driving the search process away from the previous encountered violations; and slack variable y is determined as $$y_{i,k}^2 = \begin{cases} -G_i(x_k), & \text{if } G_i(x_k) \le 0 \\ 0, & \text{otherwise} \end{cases}$$

iii) if $x_0$ is in a feasible component, using a direction of a constrained better neighborhood method and $$\Delta_x L(x,\lambda) = \begin{cases} x'-x, & x' \in \{\text{Neighbor of } x \text{ and } L(x',\lambda) \le L(x,\lambda)\} \\ 0 & \text{if otherwise} \end{cases}$$

to compute $\Delta_x L(x,\lambda)$; otherwise using better neighborhood direction in the original solution space to compute $\Delta_x L(x,\lambda)$, where $L(x,\lambda)$ is a Lagrange function;

iv) if both $U(k)$ and $\Delta_x L(x,\lambda)$ are sufficiently small, then going to step (c); otherwise updating x and $\lambda$, based on $$x^k = x^{k-1} + \Delta_x L(x^{k-1}, \lambda^{k-1})$$

$$\lambda^k = \lambda^{k-1} + U(k);$$

v) setting $k=k+1$ and repeating step (ii) through step (iv) for a predefined number of iterations;

c) if step (b) converges, outputting the current point $x_0$ as the local optimal solution.

46. The method of claim 32, the step (b)(ii) of claim 30 of finding a local optimal solution comprises the steps of applying a constrained local optimization method starting from an infeasible point.

47. The method of claim 44, in which the optimization problem is constrained and having closed-form constraint equations, and the step (b)(iii) of claim 30 of computing all the local optimal solution comprises the steps of;

a) starting from a known local optimal solution $x_s^0$;
b) setting $j=0$ and initializing a set of local optimal solutions $V_s = \{x_s^0\}$, a set of tier-0 feasible components $V_0^j = \{x_s^0\}$;
c) initializing a set of tier-(j+1) feasible components $$V_0^{j+1} = \{\phi\};$$

d) for each feasible point in $V_0^j$, $x_0^j$, performing the steps of:
  i) finding all the local optimal solutions lying within a feasible component of the constrained optimization problem containing $x_0^j$;
  ii) defining a set of search paths $S_i^j$ for $x_0^j$, $i=1,2,\ldots,k$;
  iii) for each search path $S_i^j$, finding an adjacent feasible component by the steps of:
    1) setting $i=1$;
    2) finding a point $$x_{0,i}^j,$$

located in an adjacent feasible component;
    3) starting from $$x_{0,i}^j,$$

applying a local search method to find a local optimal solution $$x_{s,i}^j; \text{ if } x_{s,i}^j$$

has been not been found before, setting $$V_0^{j+1} = V_0^{j+1} \cup \{x_{0,i}^j\}$$

and $$V_s = V_s \cup \{x_{s,i}^j\};$$

4) setting $i=i+1$; and
    5) repeating step (d)(iii)(2) through (d)(iii)(4) until $i>k$;
e) if the set of all newly computed feasible points $$V_0^{j+1}$$

is non-empty, then setting $j=j+1$ and repeating step (c) and step (d);
such that $V_s$ comprises the set of local optimal solutions of $x_s^0$.

48. The method of claim 47, in which the step (d)(iii)(2) of finding a point located in an adjacent feasible component comprises the steps of:

a) starting from $x_0 + \epsilon \times S_i^j$, where $\epsilon$ is a small number, integrating the continuous nonlinear dynamical system in reverse-time mode to obtain a reverse-time trajectory to find a point $x_d^i$ lying in an unstable equilibrium manifold of the constructed continuous nonlinear dynamical system; if the point $x_d^i$ is not found, stopping;
b) setting $x_p^i = x_d^i + (1+\epsilon)(x_d^i - x_0)$, where $\epsilon$ is a small number;
c) starting from $x_p^i$, finding a feasible point $x_0^i$ located in a connected feasible component by the steps of:
  i) integrating the constructed continuous nonlinear dynamical system starting from $x_0$ to obtain the system trajectory for a few time-steps;
  ii) if the trajectory converges to a feasible point, then stopping;
  iii) applying an iterative improvement local search algorithm starting from $x_0$;
  iv) if the local search algorithm converges to a feasible point, then stopping;
  v) setting the end point as the initial point $x_0$, and going to step (c)(i).

49. The method of claim 47, in which the step (d)(iii)(3) of finding a local optimal solution within a feasible component is a hybrid local search method comprises the steps of:
   a) applying an iterative improvement local search algorithm to the discrete optimization problem, starting from the initial point $x_0$;
   b) if the local search algorithm converges to a local optimal solution, then stopping;
   c) using a method selected from the group comprising a constrained best neighborhood search method and a constrained better neighborhood local search method, starting from the initial point $x_0$ for a few iterations to get an end point;
   d) setting the end point as the initial point; and
   e) go to step (a).

50. The method of claim 49, in which the local search algorithm of the step (a) is a preexisting constrained local search algorithm.

51. The method of claim 47, in which the step (d)(i) of finding the set of local optimal solutions inside a feasible component comprises the steps of:
   a) starting from a known local optimal solution $x_s^0$, and the set of found local optimal solutions $V_s$;
   b) setting j=0, initializing a set of tier-j local optimal solutions $$V_{new}^j = \{x_s^0\}$$

and a set of local optimal solutions within a current feasible component $$V_s^c = \{x_s^0\};$$

c) initializing a set of tier-(j+1) local optimal solutions $$V_{new}^{j+1} = \{\phi\};$$

d) for each local optimal solution in $$V_{new}^j,$$

denoted $x_s^j$, finding all new tier-one local optimal solutions located in the feasible component containing $x_s^j$ and recording the new tier-one local optimal solutions in the set $$V_s, V_{new}^{j+1} \text{ and } V_s^c;$$

e) if the set of all newly computed local optimal solutions, $$V_{new}^{j+1},$$

is not empty, setting j=j+1 and going to step (c); such that $V_s$ comprises the set of local optimal solutions of $x_s^0$.

52. The method of claim 51, in which the step (d) of finding the set of tier-one local optimal solutions comprises the steps of:
   a) starting from a known local optimal solution $x_s^0$, a set of local optimal solutions $V_s$, a given set of local optimal solutions $$V_{new}^{j+1},$$

and a set of local optimal solutions located within a current component $V_s^c$; defining a set of search paths $S_i$ for $x_s^0$, i=1,2, ..., m;
   b) for each search path $S_i$, finding another local optimal solution by a method selected from the group comprising the exit-point method and the dynamical decomposition point method;
   c) if a local optimal solution $x_s^i$ is not found, going to step (e);
   d) if $x_s^i$ has not been found before, setting $V_s = V_s \cup \{x_s^i\}$, $$V_{new}^{j+1} = V_{new}^{j+1} \cup \{x_s^i\}, \text{ and } V_s^c = V_s^c \cup \{x_s^i\};$$

e) setting i=i+1;
   f) repeating step (b) through step (e) until i>m; such that $V_s$ comprises the set of local optimal solutions of $x_s^0$.

53. The method of claim 52, in which the step (b) of finding another local optimal solution by an exit-point method comprises the steps of:
   a) starting from a known local optimal solution $x_s^0$ and a pre-defined search path;
   b) computing a corresponding exit point (EP) $x_{ex}$; if an EP cannot be found, then stopping;
   c) starting from the found exit point $x_{ex}$, proceeding by a method selected from the group comprising (i) moving along the pre-defined search path one step farther away from $x_s$ to a new point $x_0$, and (ii) using $x_0 = x_s + (1+\epsilon)(x_{ex} - x_s)$, where $\epsilon$ is a small number, if the expression is available;
   d) applying a constrained best neighborhood search method starting from $x_0$ until the constrained best neighborhood search method reaches an interface point, $x_{inf}$, at which a constrained local search method outperforms the constrained best neighborhood search method;
   e) starting from the interface point $x_{inf}$, applying the constrained local search method, chosen in step (d), to find a corresponding adjacent local optimal solution.

54. The method of claim 53, in which the constrained local search method of the step (d) is a preexisting local search algorithm.

55. The method of claim 53, in which the step (b) of finding the exit point with respect to a given search path comprises the steps of:
   i) starting from a known local optimal solution $x_s$, moving along the pre-defined search path to compute said exit point, which is a first local maximum point of the objective function of the optimization problem along the pre-defined search path;
   ii) checking constraint violations during the process; if a constraint is violated, then stopping the search process and outputting that the exit point can not be found.

56. The method of claim 52, in which the step (b) of finding another local optimal solution by a dynamical decomposition point (DDP) method comprises the steps of:
 a) starting from a known local optimal solution $x_s$ and a pre-defined search path;
 b) computing a corresponding (DDP) $x_{ddp}$; if a DDP cannot be found, then stopping;
 c) starting from the found DDP $x_{ddp}$, proceeding by a process selected from a group comprising (i) moving one step along the updated search path used to adjust the last exit point $x_{ex}$ farther away from $x_s$ to a point, denoted as $x_0$, and (ii) using $x_0 = x_s + (1+\epsilon)(x_{ddp} - x_s)$, where $\epsilon$ is a small number, if the expression is available;
 d) applying a constrained best neighborhood search method starting from $x_0$ until the constrained best neighborhood search method reaches an interface point, $x_{inf}$, at which a constrained local search method outperforms the constrained best neighborhood search method;
 e) starting from the interface point $x_{inf}$, applying the constrained local search method, chosen in step (d), to find a corresponding adjacent local optimal solution.

57. The method of claim 56, in which the constrained local search method of the step (d) is a preexisting local search algorithm.

58. The method of claim 56, in which the step (b) of finding a dynamical decomposition point (DDP) with respect to a given search path comprises the steps of:
 a) starting from a known local optimal solution $x_s$ and a pre-defined search path;
 b) computing the corresponding exit point (EP) $x_{ex}$; checking constraint violations during the process; if a constraint is violated, or an EP cannot be found, then stopping the process;
 c) starting from $x_{ex}$, and applying a constrained best neighborhood search method to move $x_{ex}$ one forward iteration to a new point $x_c$;
 d) performing a ray adjustment procedure by the steps of:
  i) forming a ray connecting $x_s$ and $x_c$;
  ii) if vectors $(x_s - x_{ex})$ and $(x_c - x_{ex})$ are available, then compute an angle $\epsilon$ between two vectors $(x_s - x_{ex})$ and $(x_c - x_{ex})$; if $\epsilon$ is close to 0° or 180°, then $x_{ex}$ is the DDP, stop; otherwise proceed to step (d)(iv);
  iii) if vectors $(x_s - x_{ex})$ and $(x_c - x_{ex})$ are not available, then update the search path to make the current $x_{ex}$ lie on the updated search path; if points $x_{ex}$, $x_c$ and $x_s$ lie on the updated search path, the $x_{ex}$ is the DDP; stop;
  iv) adjusting $x_c$ to a point $x_c'$, which is a first local maximum point of the ray starting from $x_s$;
  v) if $x_c'$ is the same point as $x_{ex}$, then stop, $x_c'$ as the DDP;
 e) using $x_c'$ as the exit point, assigning $x_c' \to x_{ex}$, and going to step (d).

* * * * *